United States Patent [19]

Steen et al.

[11] Patent Number: 5,426,527
[45] Date of Patent: Jun. 20, 1995

[54] SYSTEM FOR TRANSMITTING MULTIPLE SIGNALS ACROSS A SINGLE FIBER OPTIC CHANNEL

[75] Inventors: Roger D. Steen, Apple Valley; Donald G. Krantz, Eden Prairie, both of Minn.

[73] Assignee: Alliant Techsystems Inc., Hopkins, Minn.

[21] Appl. No.: 253,628

[22] Filed: Jun. 3, 1994

Related U.S. Application Data

[63] Continuation of Ser. No. 790,378, Nov. 12, 1991, abandoned.

[51] Int. Cl.6 .......................... H04J 14/08; H04J 14/00
[52] U.S. Cl. ..................................... 359/123; 359/114; 359/135
[58] Field of Search ............... 359/123, 124, 113, 114, 359/125, 126, 132, 135, 137

[56] References Cited

U.S. PATENT DOCUMENTS

| | | |
|---|---|---|
| 4,061,577 | 12/1977 | Bell . |
| 4,399,564 | 8/1983 | Cowen . |
| 4,441,180 | 4/1984 | Schussler .......................... 359/114 |
| 4,481,621 | 11/1984 | Schmack ............................ 359/135 |
| 4,545,048 | 10/1985 | Hauk ................................. 359/114 |
| 4,567,586 | 1/1986 | Koeck ................................ 359/137 |
| 4,621,282 | 11/1986 | Ahern ................................ 359/137 |
| 4,686,667 | 8/1987 | Ohnsorge ........................... 359/137 |
| 4,831,616 | 5/1989 | Haber ................................ 359/137 |
| 4,871,225 | 10/1989 | Schembri . |
| 4,956,834 | 9/1990 | Coleman ............................ 359/140 |
| 4,994,909 | 2/1991 | Graves ............................... 359/137 |
| 5,132,834 | 7/1992 | Shinada ............................. 359/123 |

FOREIGN PATENT DOCUMENTS

| | | |
|---|---|---|
| 0035031 | 2/1986 | Japan ................................. 359/114 |
| 0217837 | 9/1988 | Japan ................................. 359/113 |

OTHER PUBLICATIONS

Technical Data Sheet for *Hot Rod TM High-Speed Serial Link Gallium Arsenide* (Chip No. GA9011), by Gazelle Microcircuits, Inc., CA.
Fiber Optic Product News, vol. 6, No. 13 (Dec. 1991).
Naval Weapons Support Center, *Sharp Fiber Optics Workshop—1991*, (Aug. 1991).

*Primary Examiner*—Leslie Pascal
*Attorney, Agent, or Firm*—Merchant, Gould, Smith, Edell, Welter & Schmidt

[57] ABSTRACT

The present invention is a system for the transmission of a plurality of analog video, analog audio, and discrete signals across a single fiber optic cable. The system includes a transmitter which first digitizes the analog video and audio signals and then converts a combination of the digital video, digital audio, and discrete signals into a single serial digital data stream. The system modulates this digital data stream into a corresponding lightwave signal and transmits the lightwave signal across the fiber optic cable. A receiver within the system demodulates the lightwave signal into a serial digital data stream, which is then converted into a parallel signal so that the receiver may restore the analog video, analog audio, and discrete signals from the parallel combination of signals.

14 Claims, 28 Drawing Sheets

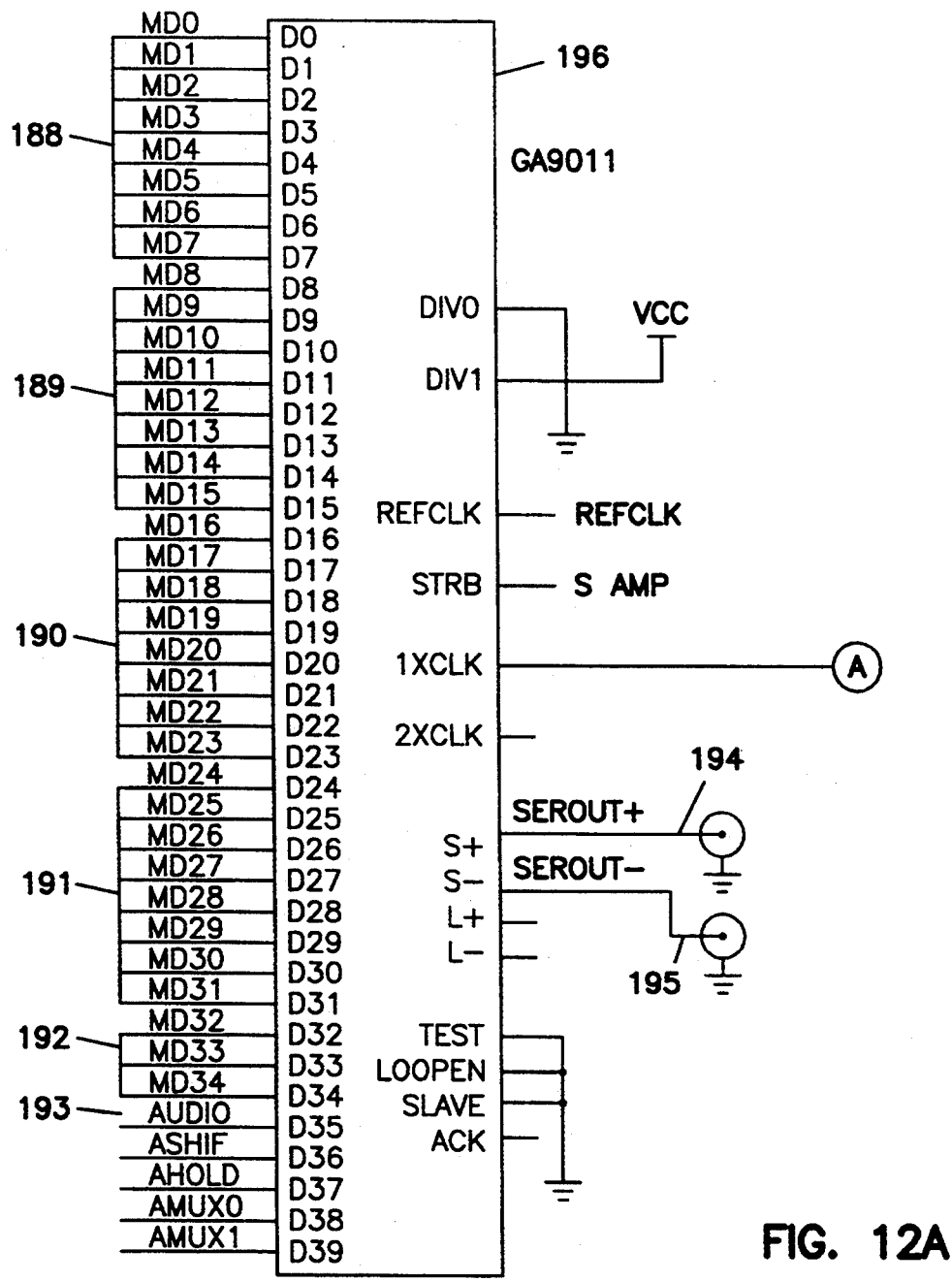
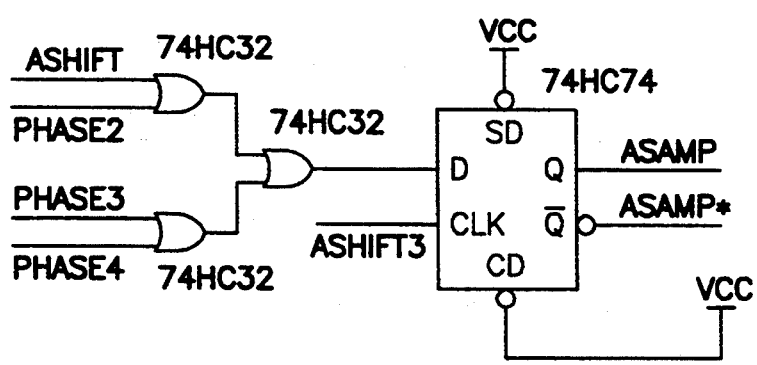
FIG. 12A

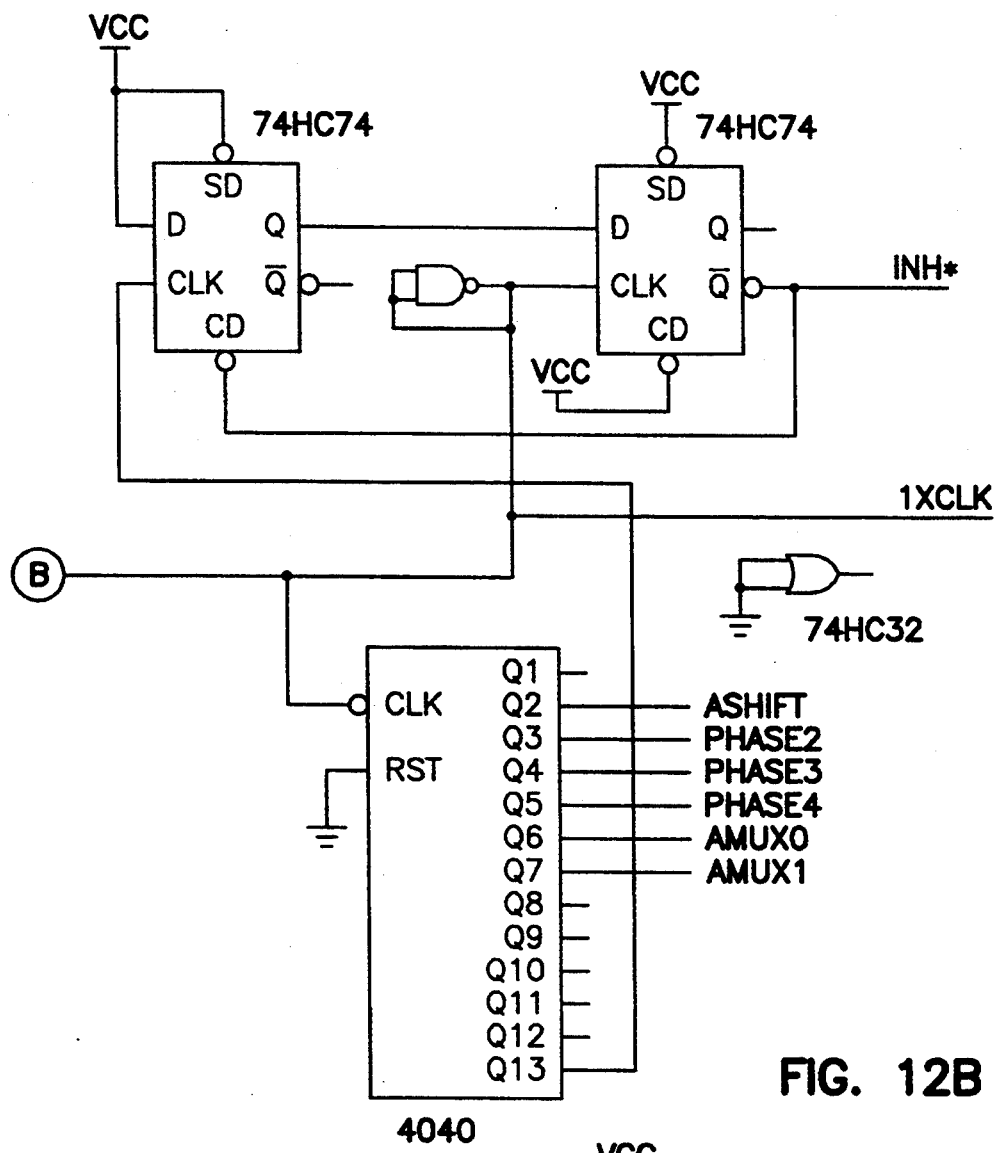
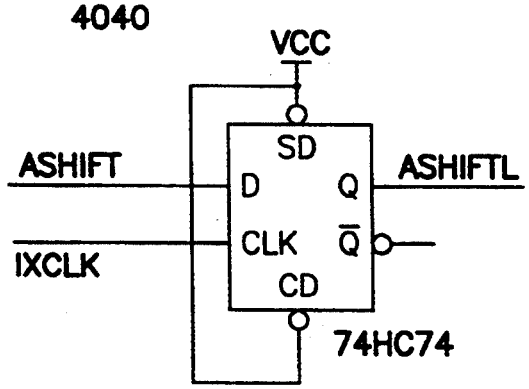
FIG. 12B

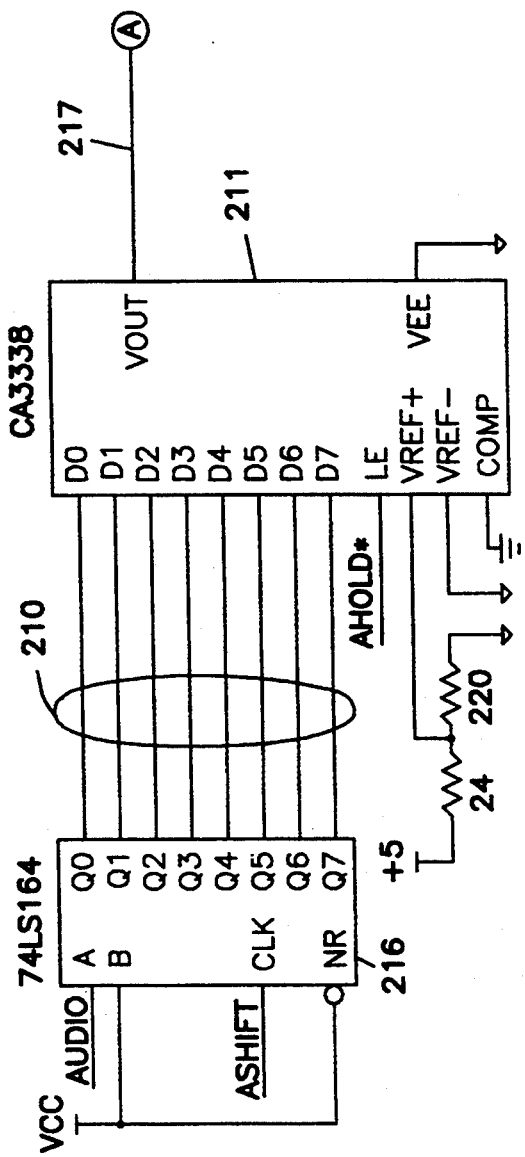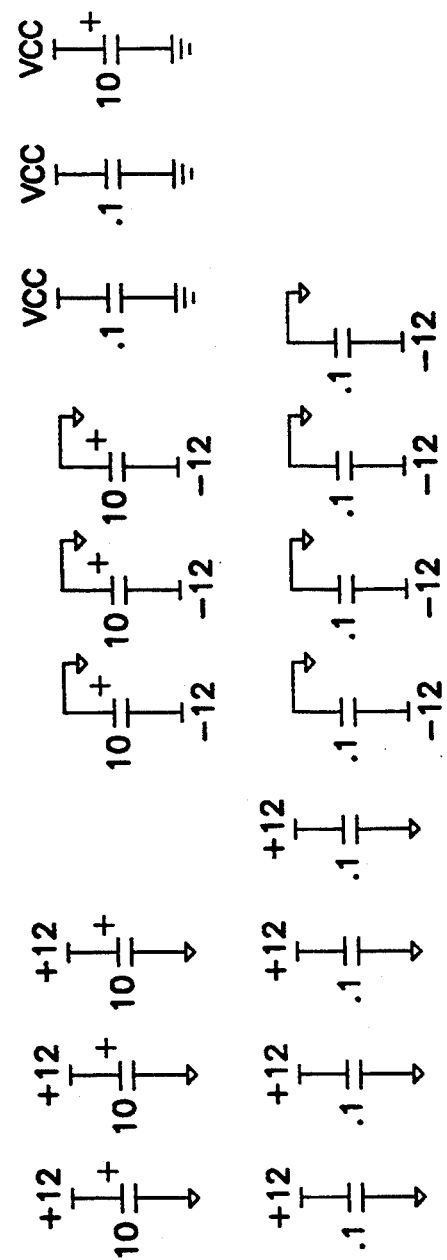
FIG. 19A

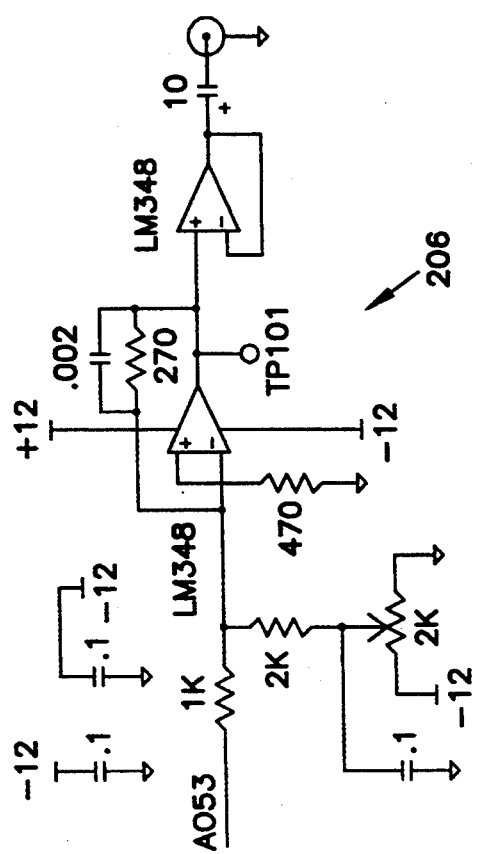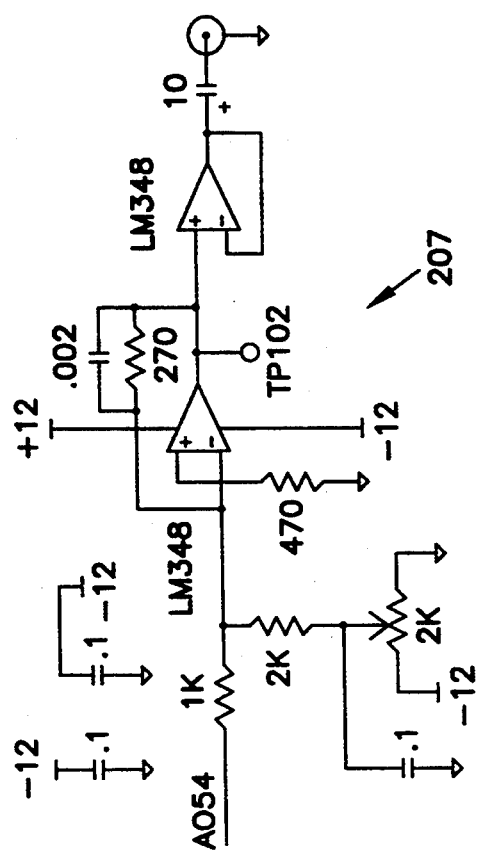
FIG. 20

SYSTEM FOR TRANSMITTING MULTIPLE SIGNALS ACROSS A SINGLE FIBER OPTIC CHANNEL

This is a continuation, of application Ser. No. 07/790,378, filed Nov. 12, 1991 now abandoned.

FIELD OF THE INVENTION

The present invention relates to a system for transmitting multiple signals across a single fiber optic channel.

BACKGROUND OF THE INVENTION

Communications channels provide for the transmission of signals, which are usually video, audio, and discrete signals. The bandwidth of a communications channel limits the number of signals that can be transmitted over the channel and thus determines how much information may be transmitted across the communications channel. Many communications links, particularly those transmitting video signals, require a system with the capability to transmit large quantities of information over the limited bandwidth of the communications link by employing techniques for combining and modulating signals.

Often, the physical parameters of the communications link become a significant design consideration for a communications system. The weight and physical size of the communications medium for transmitting signals may be limited by a design environment. This further requires that, since the bandwidth of the system is limited, a communications system must have techniques for transmitting more information without changing the bandwidth of the communications channel.

Fiber optic communications links provide for a significant weight reduction of the communications channel. However, a fiber optic link also has a limited bandwidth that may not be sufficient for transmitting, by conventional communications systems, the number of signals required. While fiber optic cables may be grouped into a bundle to transmit more signals, certain design environments either do not allow for more than a single fiber optic cable or could significantly benefit from the use of only a single fiber optic cable to transmit all of the required signals.

There is, therefore, a need for a communications system capable of transmitting a plurality of multiple video, audio, and discrete signals across a single fiber optic cable.

The present invention solves these and other shortcomings of the prior art described above. The present invention also solves other shortcomings of the prior art which will become apparent to those skilled in the art upon reading and understanding the present specification.

SUMMARY OF THE INVENTION

The present invention is a system for transmitting a plurality of analog video, analog audio, and discrete signals across a single fiber optic cable. The system converts the analog video and audio signals into corresponding digital video and audio signals. A high-speed parallel-to-serial conversion process converts a combination of the digital video, digital audio, and discrete signals into a single serial digital data stream. The system then converts this digital data stream into a corresponding lightwave signal and transmits the lightwave signal across the fiber optic cable. A receiver within the system converts the lightwave signal into a serial digital data stream, which is converted into a parallel signal so that the analog video, analog audio, and discrete signals may be restored from this parallel combination of signals.

BRIEF DESCRIPTION OF THE DRAWINGS

In the drawings where like numerals refer to like components throughout several views.

FIG. 12 is a circuit diagram of a high-speed parallel-to-serial converter in the preferred transmitter.

FIG. 20 is a circuit diagram of filters and buffers for first and second audio signals in the preferred receiver.

DETAILED DESCRIPTION OF THE PREFERRED EMBODIMENT

In the following detailed description of the preferred embodiment, reference is made to the accompanying drawings which form a part hereof and in which is shown by way of illustration a specific embodiment in which the invention may be practiced. This embodiment is described in sufficient detail to enable those skilled in the art to practice the invention, and it is to be understood that other embodiments may be utilized and that structural or logical changes may be made without departing from the scope of the present invention. The following detailed description is, therefore, not to be taken in a limiting sense, and the scope of the present invention is defined only by the appended claims and the equivalents thereof.

OVERVIEW OF THE SYSTEM

Figure 1:
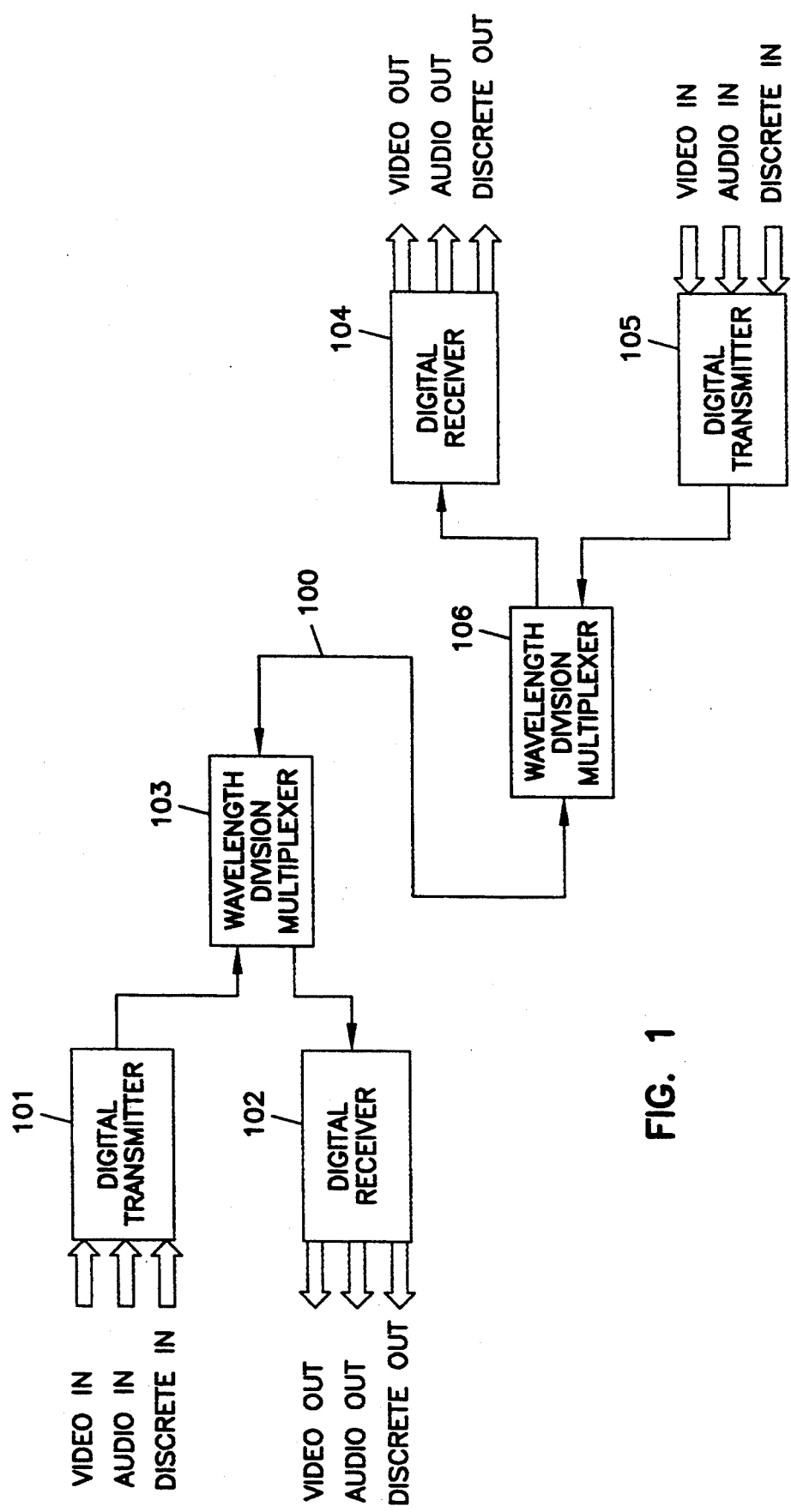
FIG. 1 is a block diagram of a system that incorporates the present invention.

As shown in FIG. 1, the present invention is a system for transmission of a plurality of signals across a single fiber optic channel 100. In the preferred embodiment, the system transmits four NTSC video signals, four audio signals, and three discrete signals across one single mode fiber optic channel. The preferred system achieves full-duplex transmission by using different wavelengths for transmission in opposite directions across the fiber optic channel.

A digital transmitter 101 receives the plurality of multiple video, audio, and discrete signals. Digital transmitter 101 converts this combination of signals into a single serial data signal. A digital receiver 102 receives a serial data signal from a fiber optic channel 100 and converts the serial data signal into a corresponding plurality of multiple video, audio, and discrete signals. In the preferred embodiment, the serial data signal from digital transmitter 101 is transmitted at 1310 nanometers across the fiber optic channel, and the serial data signal from the fiber optic channel to digital receiver 102 is transmitted at 1550 nanometers.

A wavelength division multiplexer 103 divides the serial data signals transmitted at the two different wavelengths on the fiber optic channel and routes a first serial data signal from transmitter 101 to the fiber optic channel and a second serial data signal from the fiber optic channel to receiver 102. At the other end of the fiber optic channel, a digital transmitter 105, a digital receiver 104, and a wavelength division multiplexer 106 perform corresponding functions as the elements described above.

DIGITAL TRANSMITTER

Figure 2:
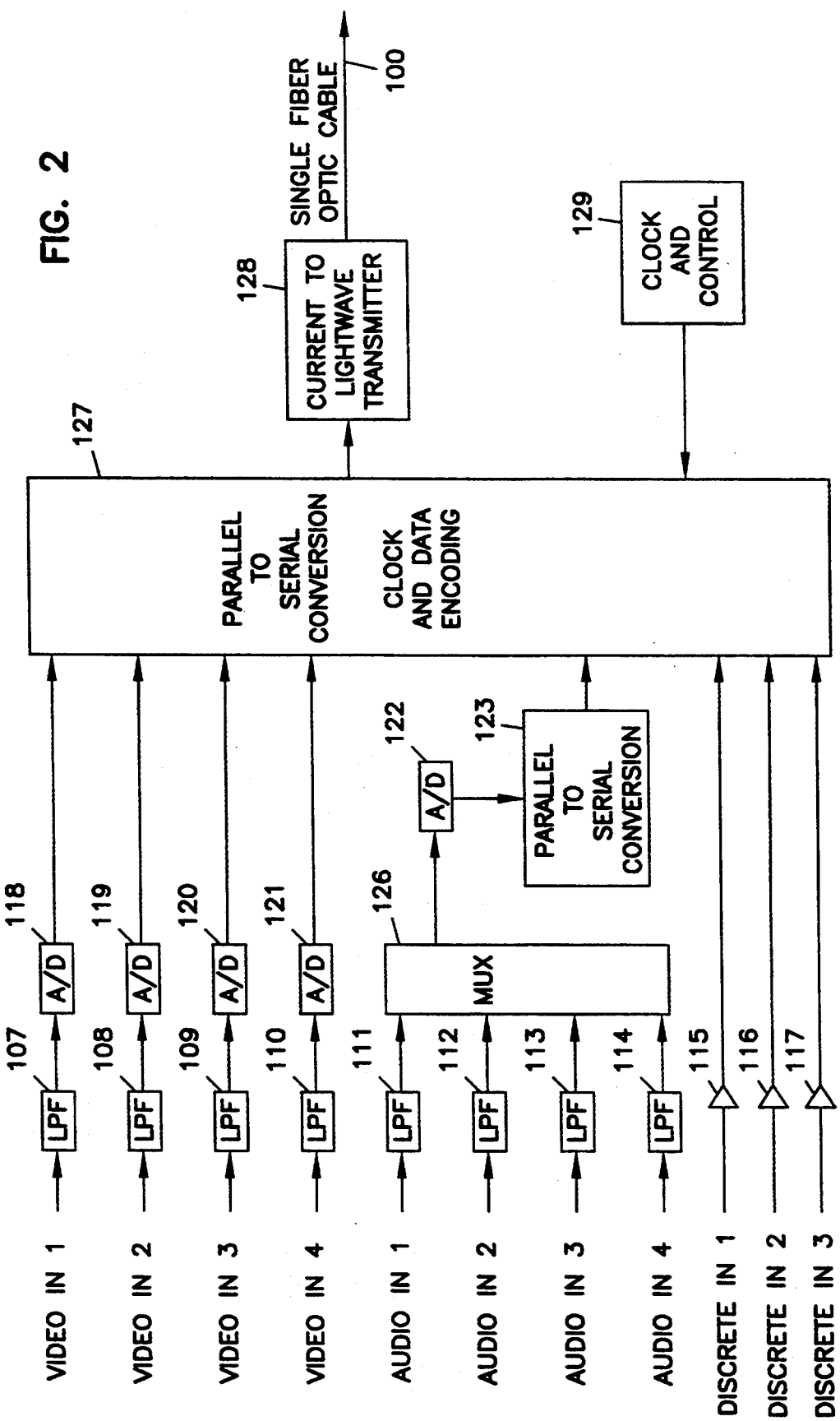
FIG. 2 is a block diagram of the transmitter portion of the present invention.

FIG. 2 shows a more detailed block diagram of digital transmitters 101 and 105. The video and audio signals are first filtered by low pass filters ("LPF") 107–114 to remove any high frequency noise components. After filtering, the analog video signals are converted into corresponding digital signals by analog-to-digital converters 118–121. The digital video signals are transmitted directly to a parallel-to-serial converter 127. The analog audio signals are first multiplexed into one signal by a multiplexer 126 before being analog-to-digital converted (122) and transmitted to parallel-to-serial converters 123 and 127. The discrete signals, being already in digital form, are filtered by buffers 115–117 and transmitted directly to parallel-serial-converter 127.

Parallel-to-serial converter 127 receives the four digital video signals, multiplexed digital audio signal, and three discrete signals, and converts this combination into a single serial data signal. The serial data signal is received by a current-to-lightwave transmitter 128 and modulated into a corresponding lightwave signal, which is transmitted across fiber optic cable 100. At one end of the fiber optic channel, the serial data signal is modulated into a lightwave signal having a wavelength of 1310 nanometers. At the other end of the fiber optic channel, the serial data signal is modulated into a lightwave signal having a wavelength of 1550 nanometers. The use of two wavelengths provides for full-duplex transmission across a single channel.

Figure 4:
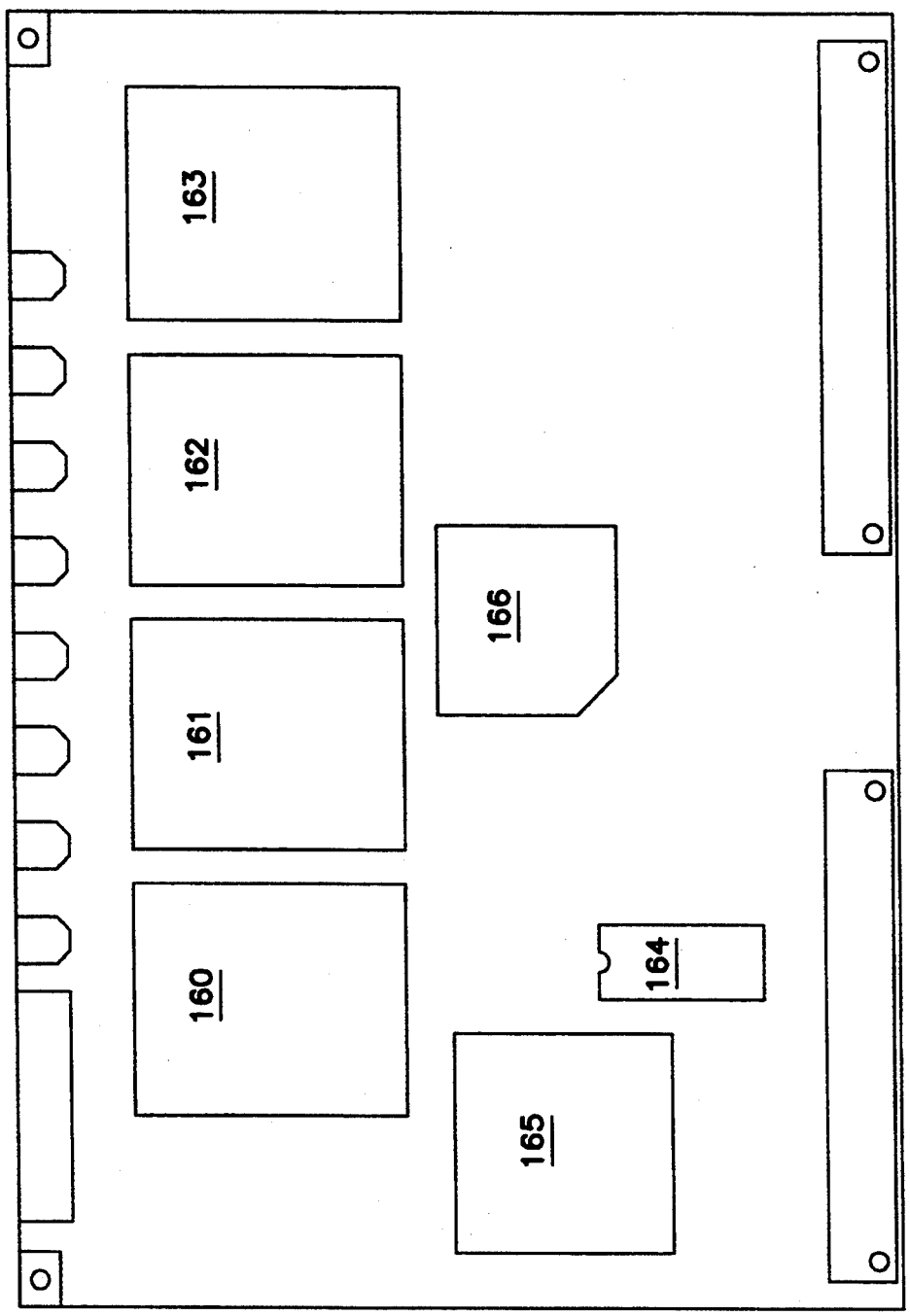
FIG. 4 is a preferred layout of a printed circuit board containing the transmitter circuitry.

FIG. 4 shows a preferred printed circuit board layout for the transmitter. Blocks 160–163 each contain the circuitry for the four video filters and analog-to-digital converters. Block 165 contains the circuitry for multiplexing the four analog audio signals, and block 164 contains the circuitry for the analog-to-digital conversion of the multiplexed audio signal. Block 166 contains the circuitry for the high-speed parallel-to-serial conversion of the digital video, multiplexed digital audio, and discrete signals.

Figure 5:
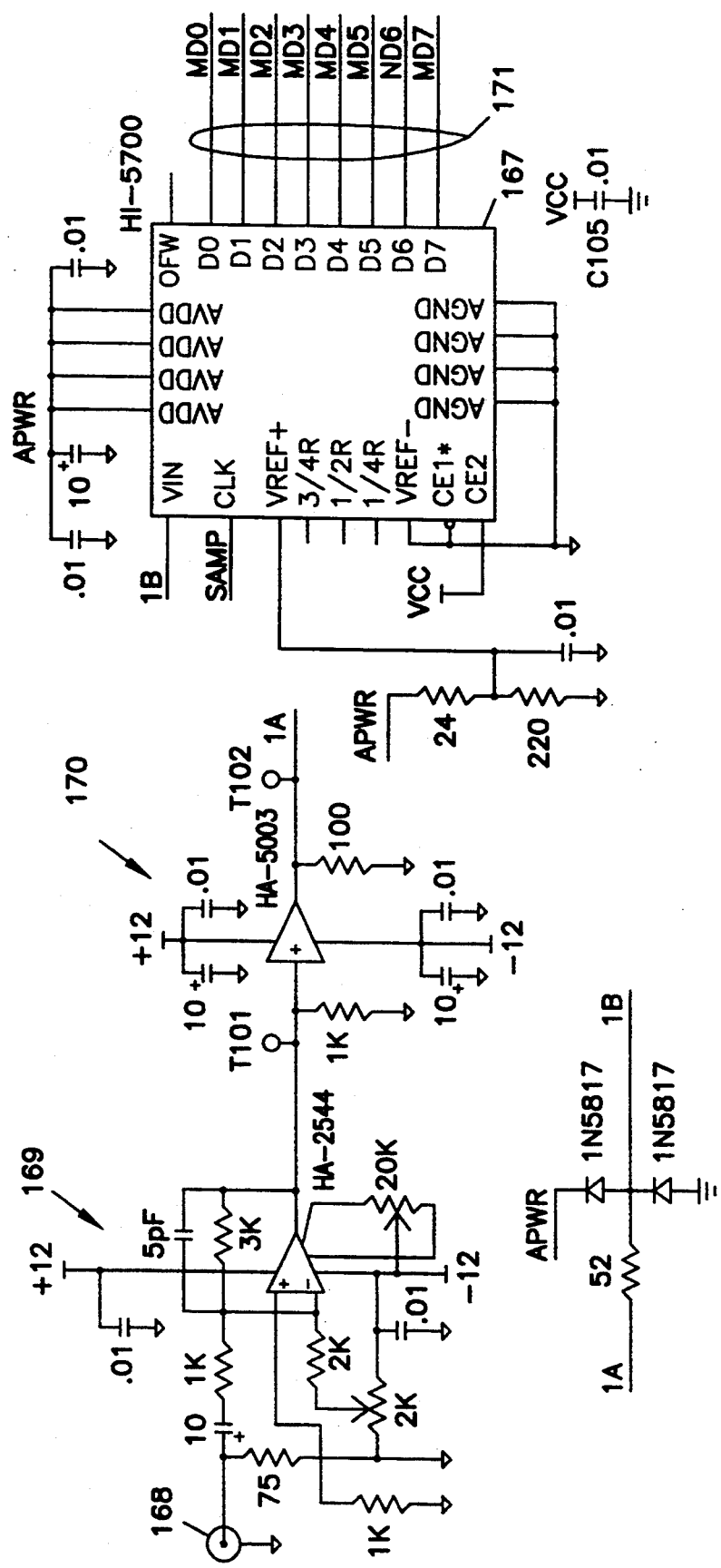
FIG. 5 is a preferred circuit diagram of a filter and analog-to-digital converter for a first analog video signal.
Figure 6:
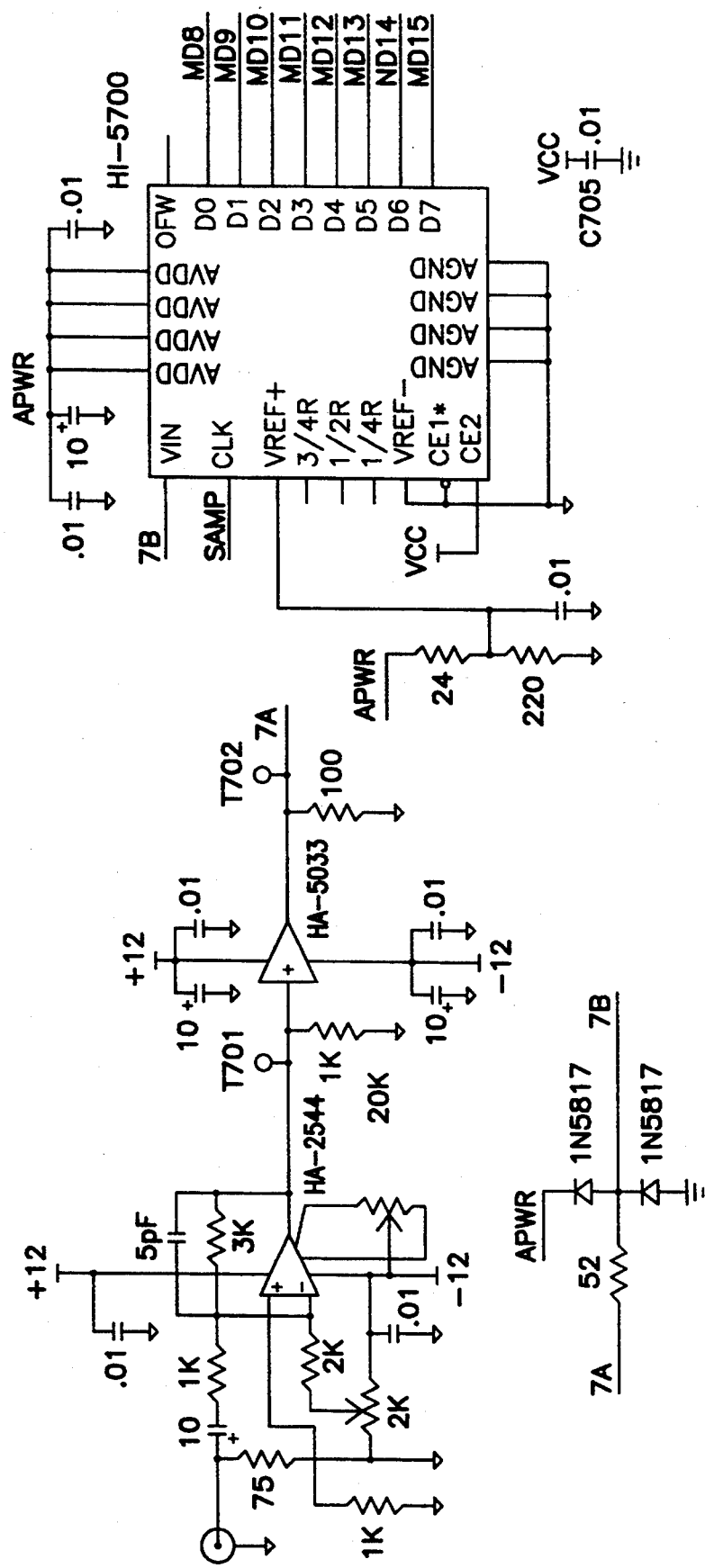
FIG. 6 is a preferred circuit diagram of a filter and analog-to-digital converter for a second analog video signal.
Figure 7:
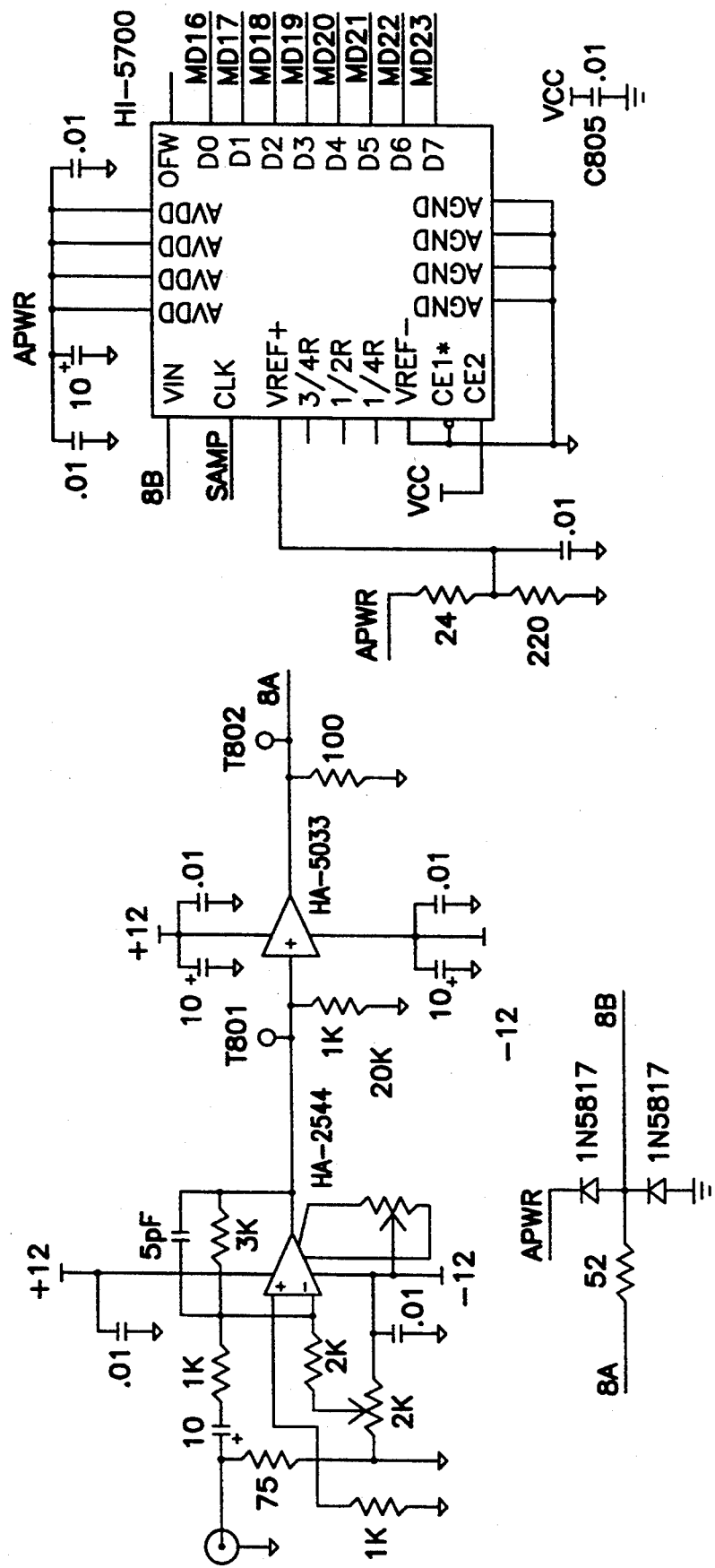
FIG. 7 is a preferred circuit diagram of a filter and analog-to-digital converter for a third analog video signal.
Figure 8:
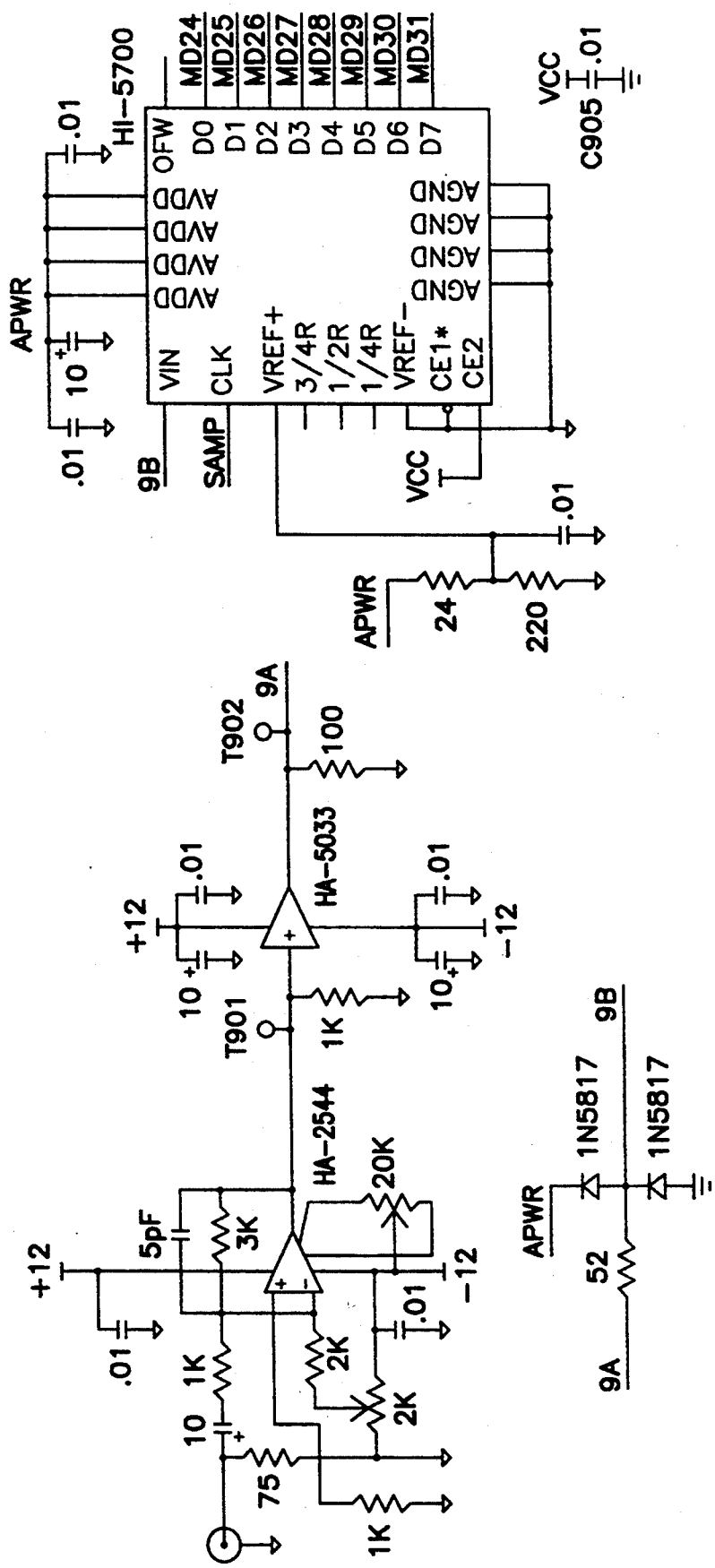
FIG. 8 is a preferred circuit diagram of a filter and analog-to-digital converter for a fourth analog video signal.

FIGS. 5–8 show the preferred circuit diagrams of the filters, buffers, and analog-to-digital converters for the four video input signals. Referring to FIG. 5, an analog video signal is coupled to the circuit at a connection 168. Stage 169 is a low pass filter, which removes high frequency noise components from the analog video signal. Stage 170 is a buffer. The buffer provides a sufficient signal strength to drive the input to the analog-to-digital converter 167. Analog-to-digital converter 167 receives the buffered analog video signal and converts it to a corresponding eight-bit digital signal on lines 171. The circuitry of FIGS. 6–8 operates in a similar manner for the other three analog video signals.

Figure 9:
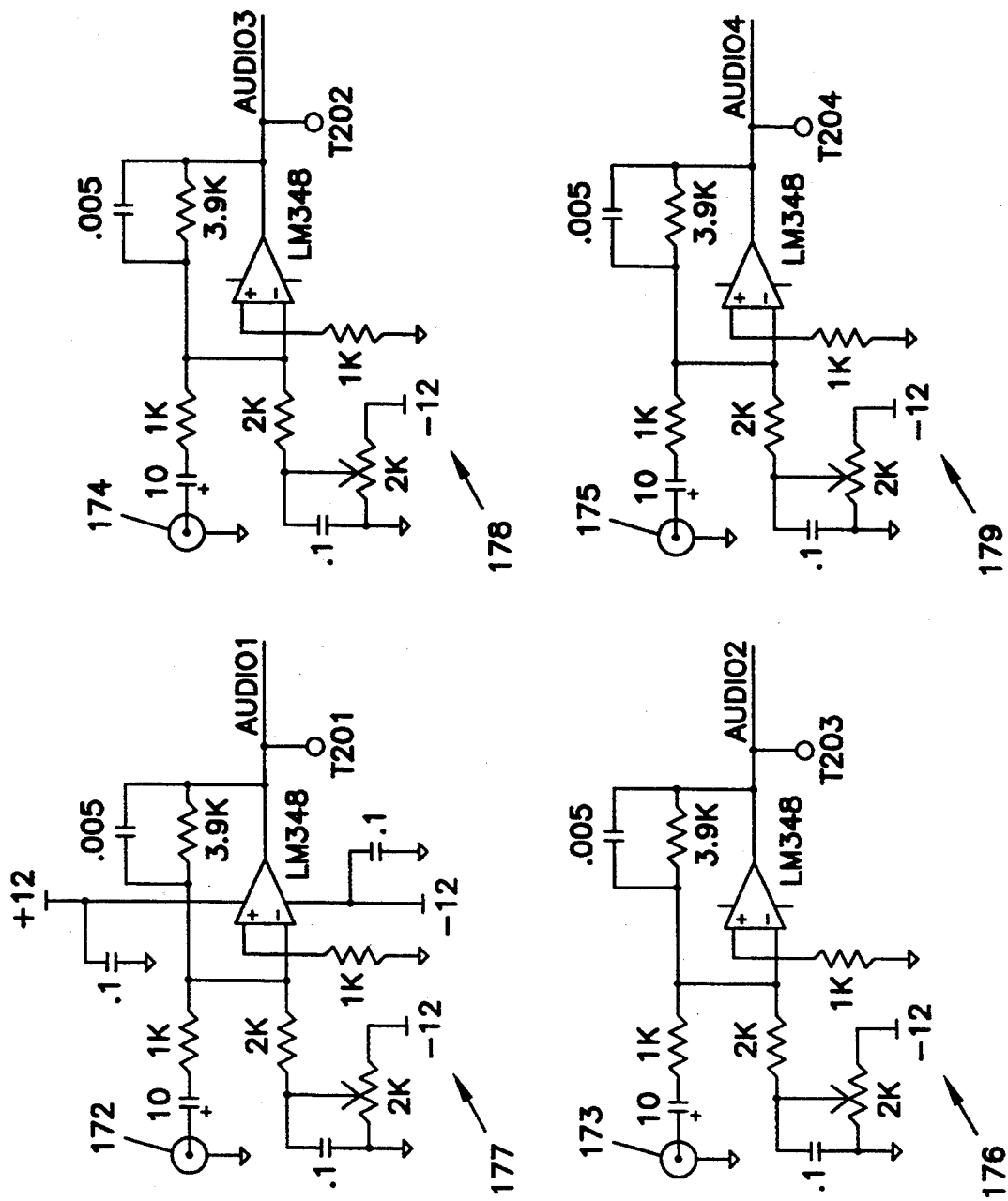
FIG. 9 shows preferred circuit diagrams of transmitter filters and buffers for the four analog audio signals.

FIG. 9 shows the preferred circuit diagram for the audio input filters. The four analog audio signals are coupled to the circuits at input connections 172–175. Circuits 176–179 are low pass filters built around op-amp buffers, which remove high frequency noise from the four audio input signals.

Figure 10:
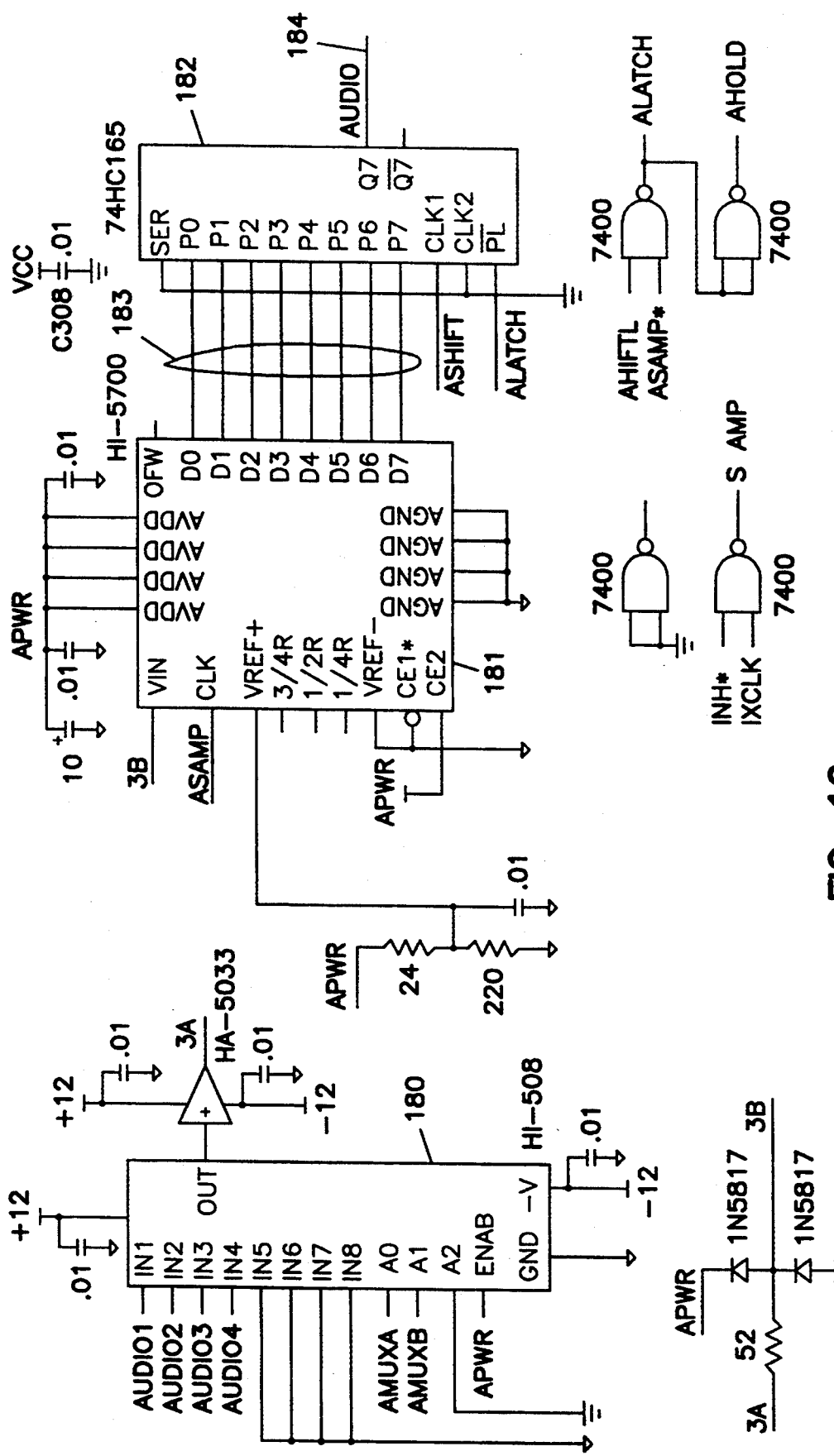
FIG. 10 is a preferred circuit diagram for a audio multiplexer and analog-to-digital converter.

FIG. 10 shows the preferred circuit diagram of the multiplexer and analog-to-digital converter for the four audio input signals. Circuit 180 receives the four filtered audio signals from the circuits shown in FIG. 9. A circuit 180 multiplexes the four analog audio signals into a single analog multiplexed audio signal. An analog-to-digital converter circuit 181 receives the analog multiplexed audio signal and converts it into a corresponding eight-bit digital audio signal, which is output onto lines 183. A parallel-to-serial converter circuit 182 receives the eight-bit digital audio signal and converts it into a single bit stream, which is output onto a line 184. The single bit stream is thus a multiplexed digital representation of the four analog input audio signals.

Figure 11:
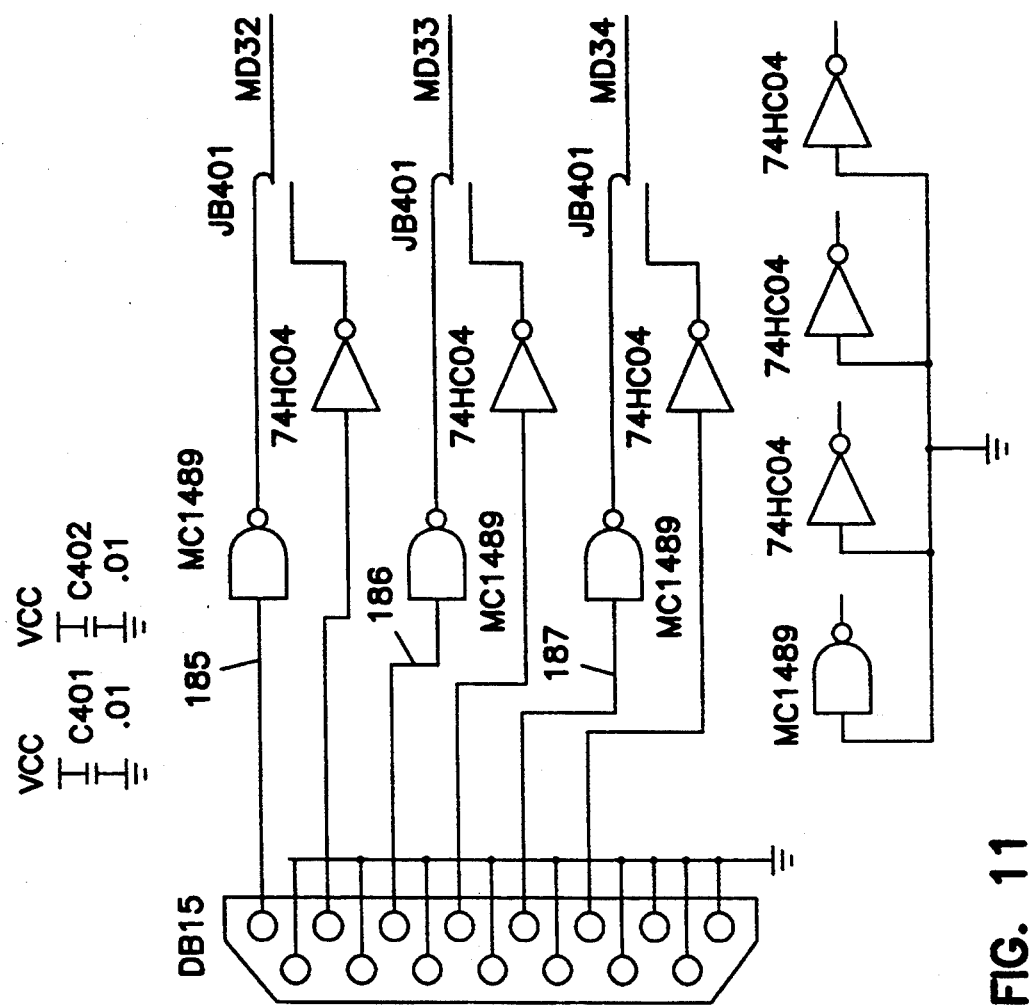
FIG. 11 is a preferred circuit diagram of transmitter inputs and buffers for three discrete signals.
Figure 13:
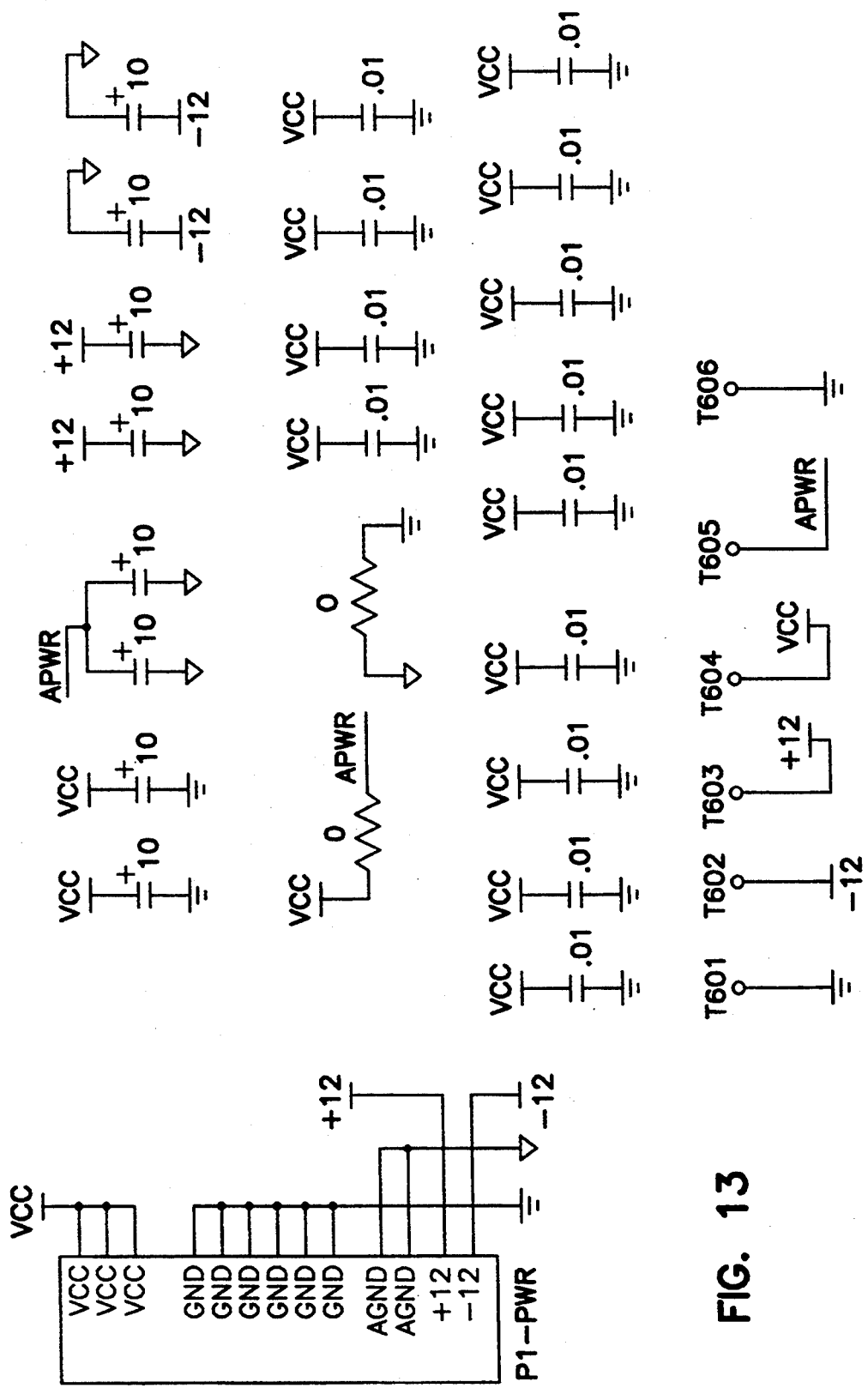
FIG. 13 is a circuit diagram of power and ground connections for the preferred transmitter.

FIG. 11 shows the preferred circuit diagram of the buffers for the three input discrete signals on lines 185–187. The discrete signals, in the preferred embodiment, are either RS232 or TTL compatible signals.

FIG. 12 shows the preferred circuit diagram of a high-speed parallel-to-serial converter 196. Circuit 196 receives the four digital video signals 188–191, the multiplexed serial digital audio signal 193, and the three discrete signals 192. Circuit 196 converts the parallel combination of these signals into a single serial digital data stream, which is output onto lines 194 and 195 as a pair of complementary signals.

Figure 14:
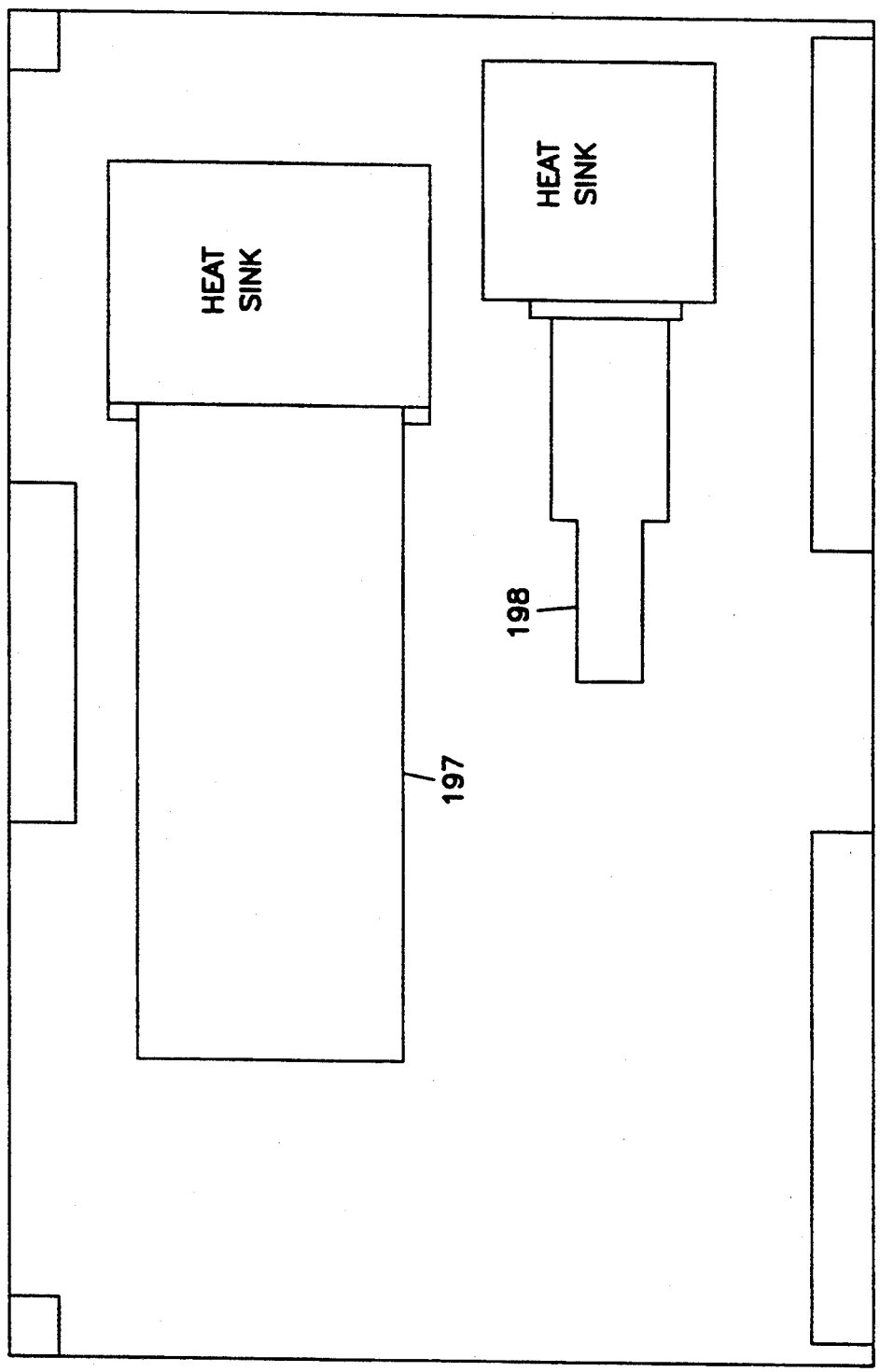
FIG. 14 is a card layout drawing for the current to lightwave converter in the preferred transmitter.
Figure 15:
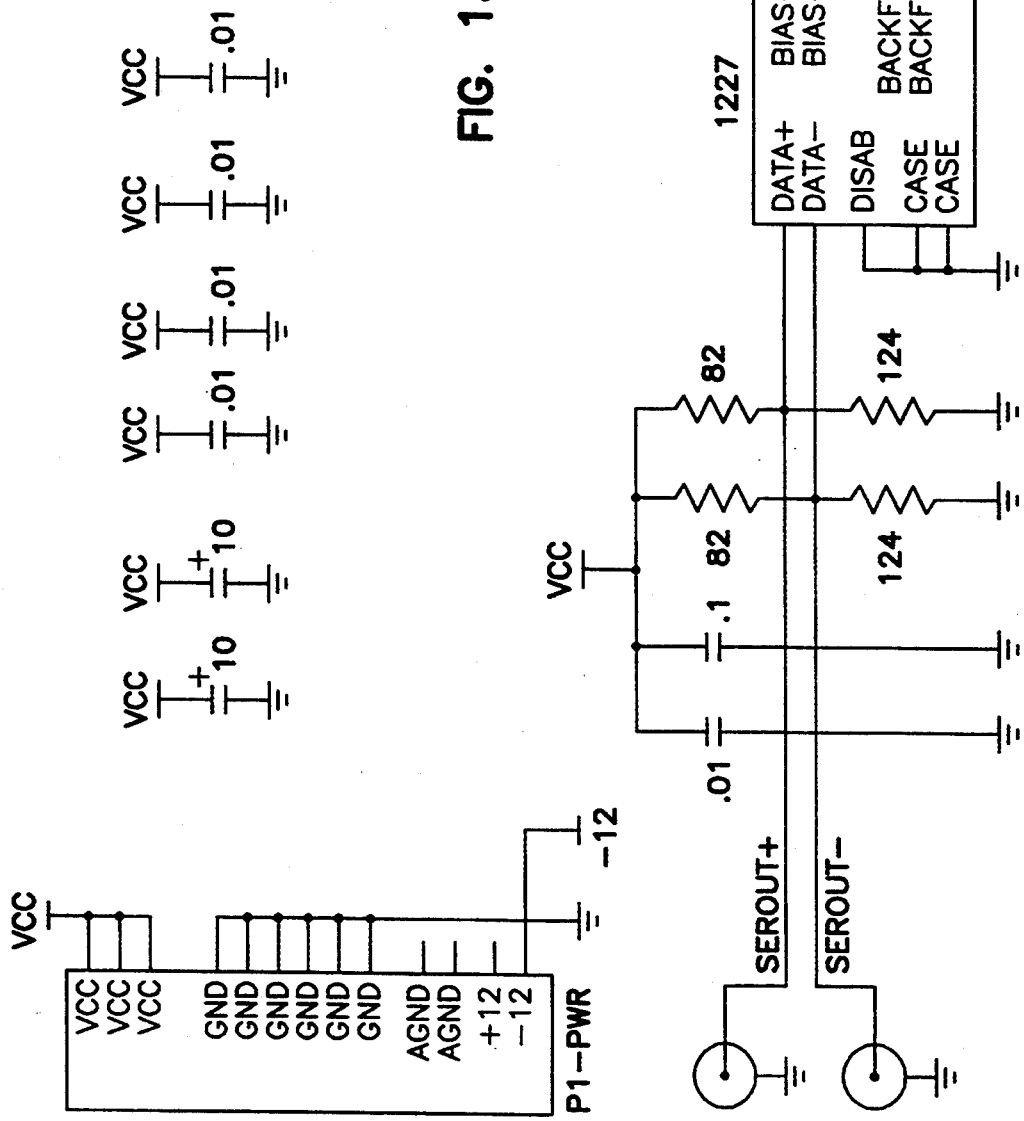
FIG. 15 is a circuit diagram of power and ground connections for the preferred current to lightwave converter at one end of the channel.
Figure 16:
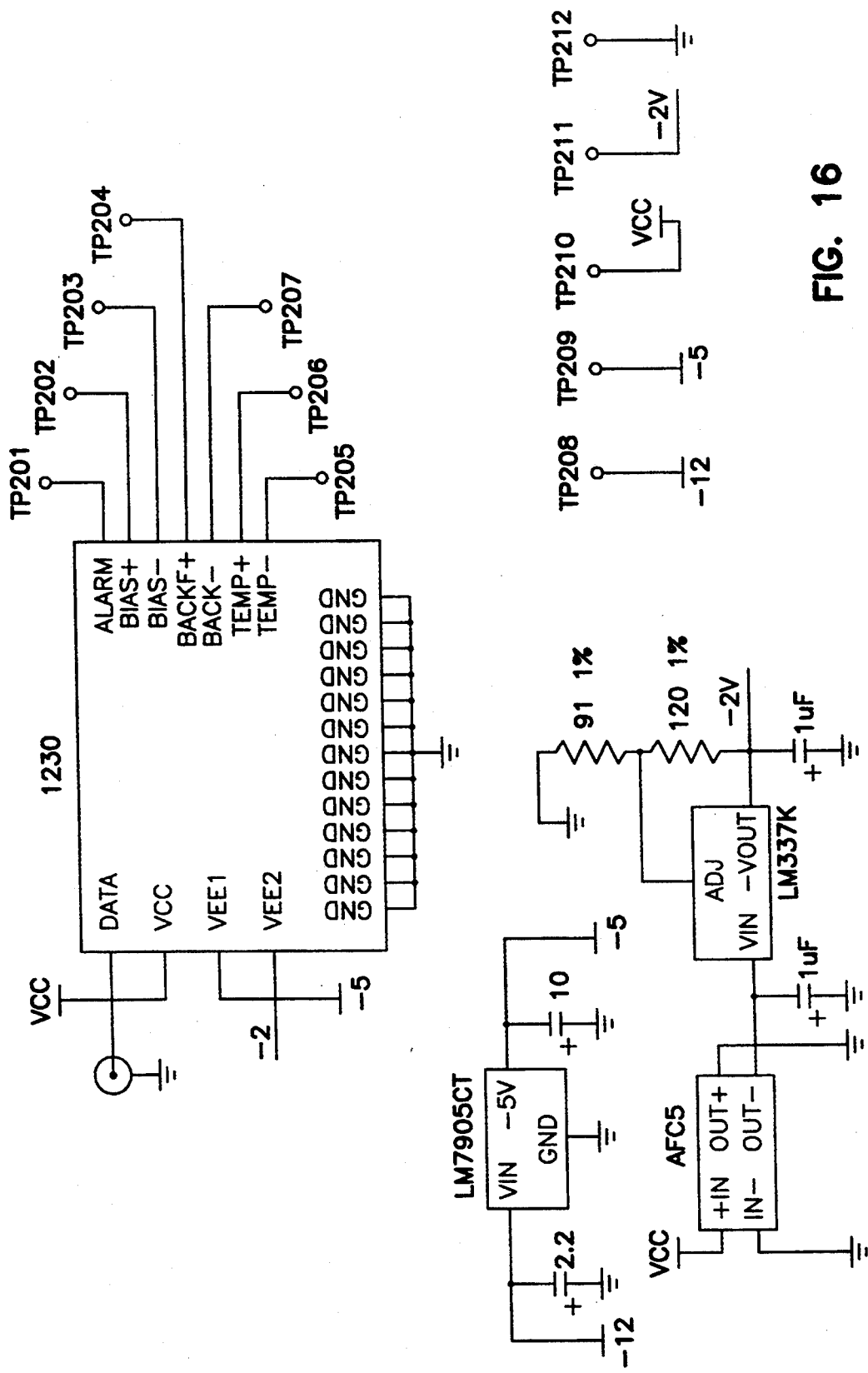
FIG. 16 is a circuit diagram of power and ground connections for the preferred current to lightwave converter at the other end of the channel.

FIG. 14 shows the preferred card layout drawing for the current-to-lightwave converter. Circuits 197 and 198 receive the serial digital data stream from the circuit of FIG. 12 and convert this data stream into corresponding lightwave signals. In the preferred embodiment, circuit 197 converts the data stream into a lightwave signal having a wavelength of 1550 nanometers, and circuit 198 converts the data stream into a lightwave signal having a wavelength of 1310 nanometers. The use of two different wavelengths allows for signals to be transmitted across the fiber optic link in opposite directions for full-duplex communications. One skilled in the art will recognize that other wavelengths may be used without departing from the scope of the invention.

DIGITAL RECEIVER

Figure 3:
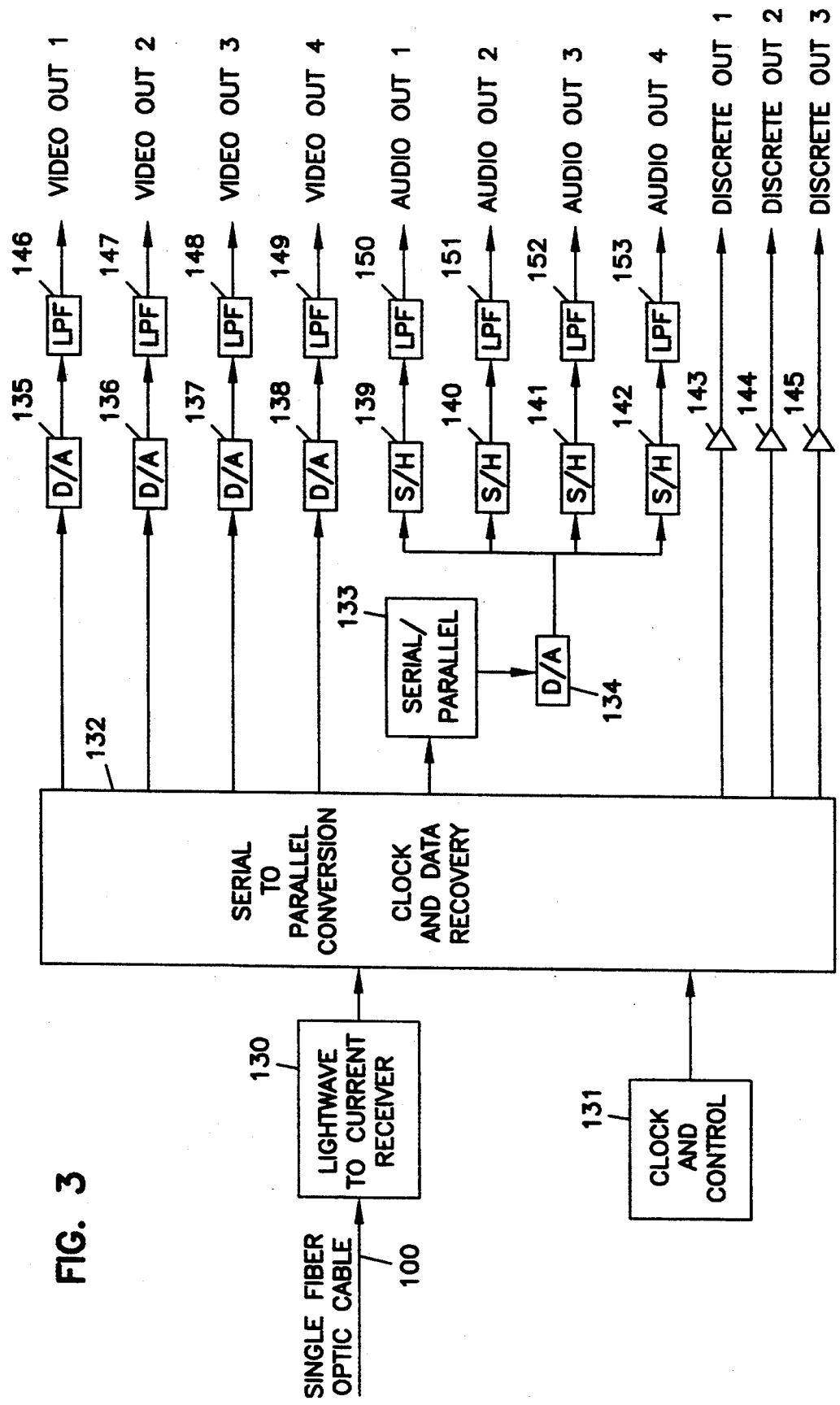
FIG. 3 is a block diagram of the receiver portion of the present invention.

FIG. 3 shows a more detailed block diagram of digital receivers 102 and 104. The lightwave signal from fiber optic channel 100 is demodulated into a corresponding serial data signal by a lightwave-to-current receiver 130. A serial-to-parallel converter 132 receives the serial data signal and converts it into a corresponding parallel signal, the parallel signal comprising a combination of the digital video signals, multiplexed digital audio signal, and discrete signals. The digital video signals are converted into corresponding analog signals by digital-to-analog converters 135–138, and these analog signals are filtered by low pass filters 146–149 to remove any high frequency noise components.

A serial-to-parallel converter 133 receives the multiplexed digital audio signal and converts it into a parallel digital audio signal, which is converted to a corresponding multiplexed analog signal by a digital-to-analog converter 134. Four sample-and-holds 139–142 sample the multiplexed analog audio signal to extract the four analog audio signals. These four analog audio signals are filtered by low pass filters 150–153 to remove any high frequency noise components. The three discrete signals are received from serial-to-parallel converter 132 and filtered by buffers 143–145.

Figure 17:
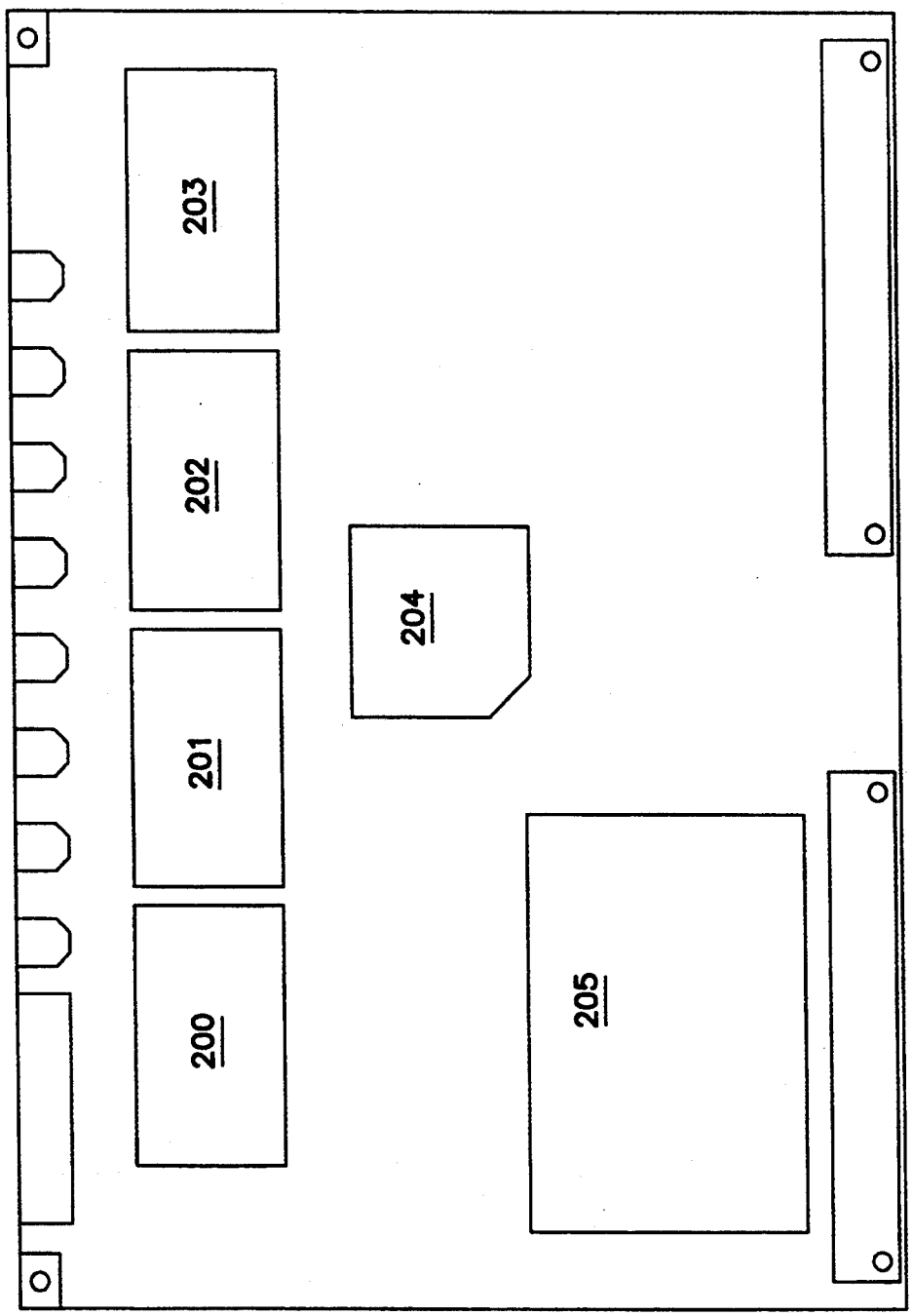
FIG. 17 is a preferred layout of a printed circuit board containing receiver circuitry.

FIG. 17 shows a preferred printed circuit board layout for the receiver. Blocks 200–203 each contain the circuitry for the four video filters and digital-to-analog converters. Block 205 contains the circuitry for demultiplexing and digital-to-analog conversion of the four digital audio signals. Block 204 contains the circuitry for the high-speed serial-to-parallel conversion of the serial digital data stream into the digital video, multiplexed digital audio, and discrete signals.

Figure 18:
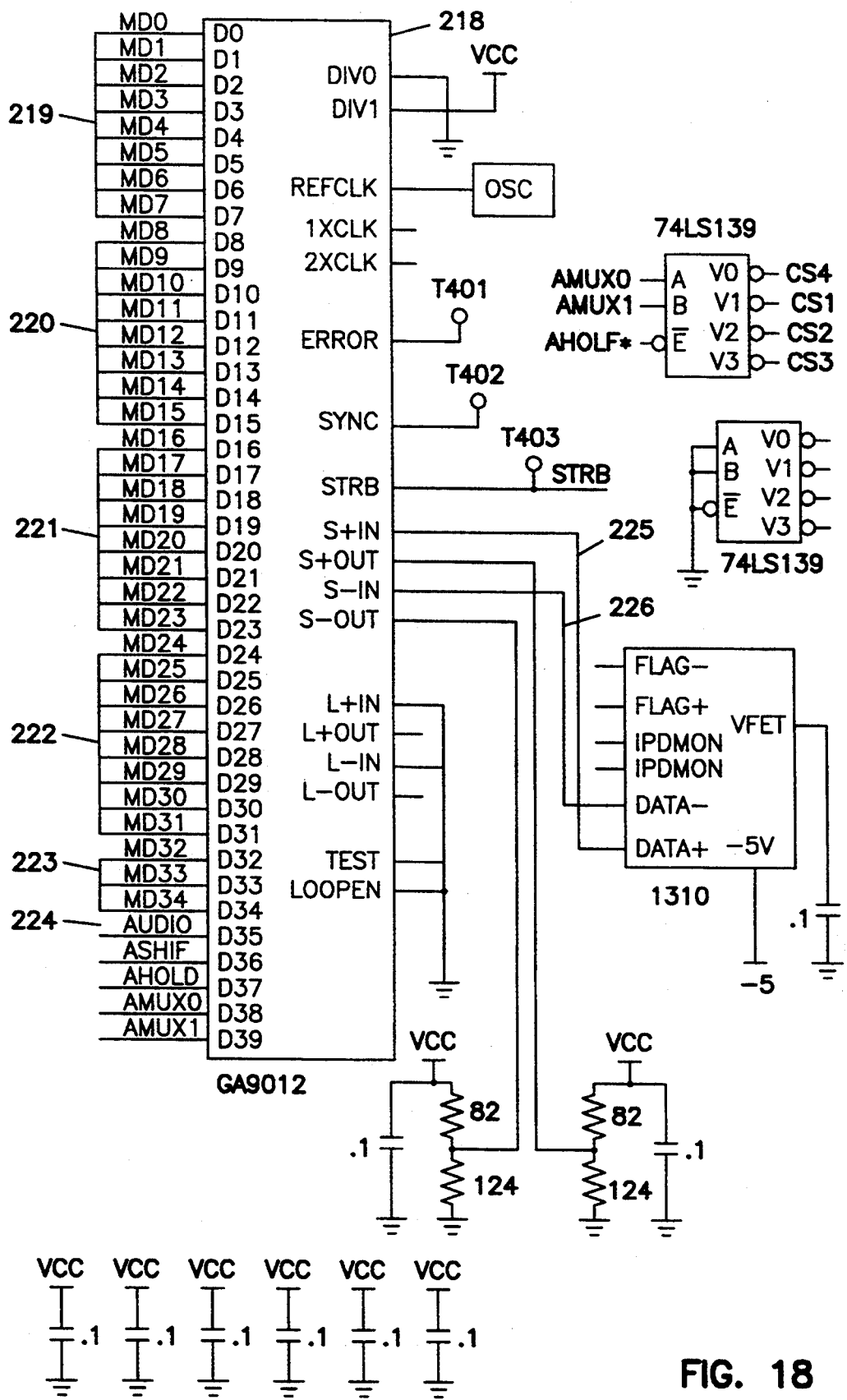
FIG. 18 is a circuit diagram of a high-speed serial-to-parallel converter in the preferred receiver.

FIG. 18 shows a preferred circuit diagram for the high-speed serial-to-parallel conversion of the digital data stream from the fiber optic channel into a corresponding parallel signal. A converter circuit 218 receives the serial digital data stream on lines 225 and 226 as complementary input signals and converts this serial data stream into a parallel digital data signal comprising the four digital video signals 219–222, the three discrete signals 223, and the multiplexed digital audio signal 224.

Figure 19B:
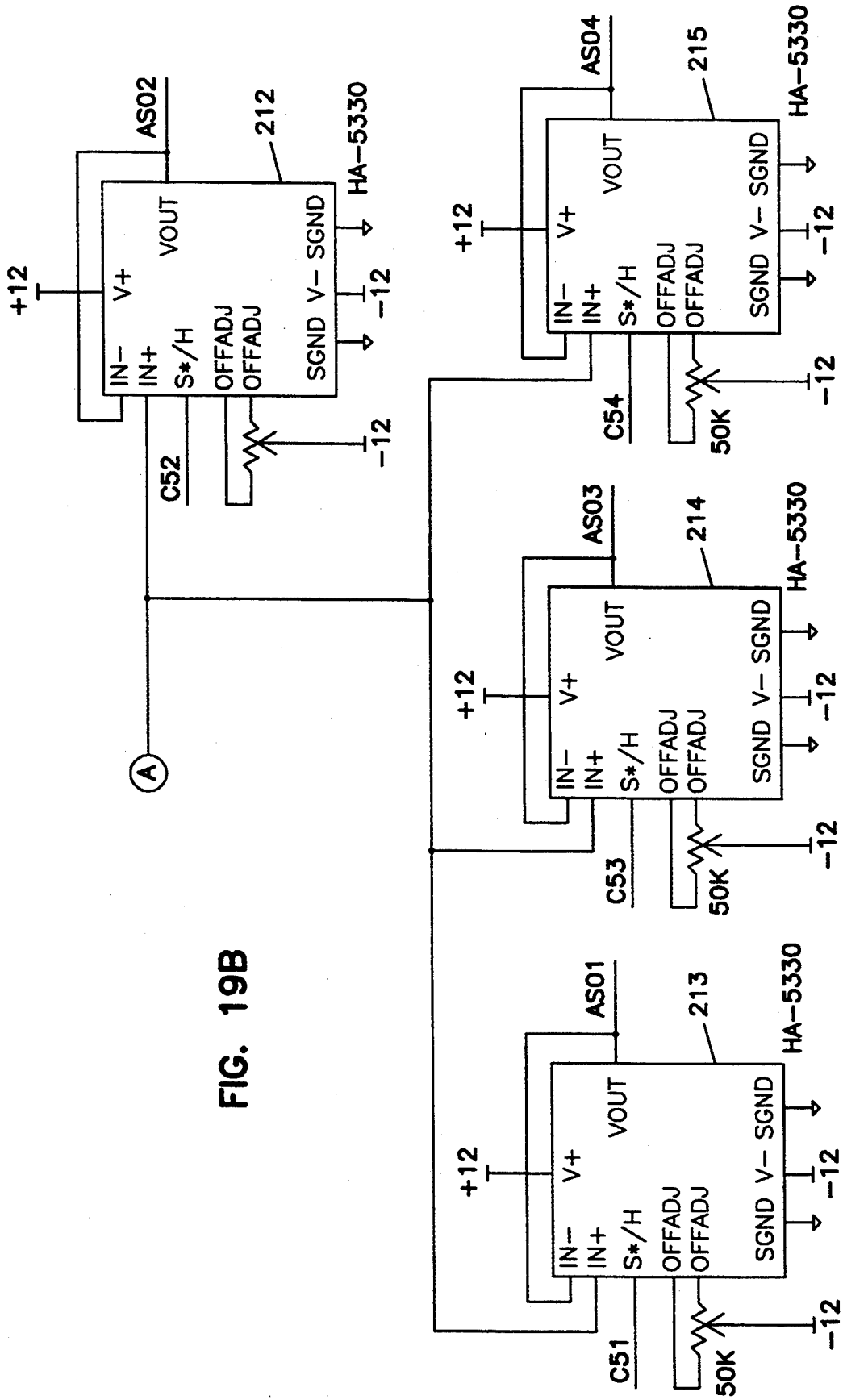
FIG. 19 is a circuit diagram of an audio demultiplexer for the four audio signals in the preferred receiver, which comprises a digital-to-analog converter and four sample-and-hold circuits.

FIG. 19 shows the preferred circuit diagram of the demultiplexer for the four audio signals, which comprises a digital-to-analog converter coupled to four sample-and-hold circuits. A converter circuit 216 receives the single serial digital audio data stream and converts it into a corresponding eight-bit parallel signal output onto lines 210. A digital-to-analog converter circuit 211 receives the parallel multiplexed digital audio signal from lines 210 and converts it into a corresponding analog multiplexed audio signal output on a line 217. Circuits 212–214 are four sample-and-hold circuits which receive the analog audio signal from line 217 and demultiplex it into the corresponding four analog audio signals.

Figure 21:
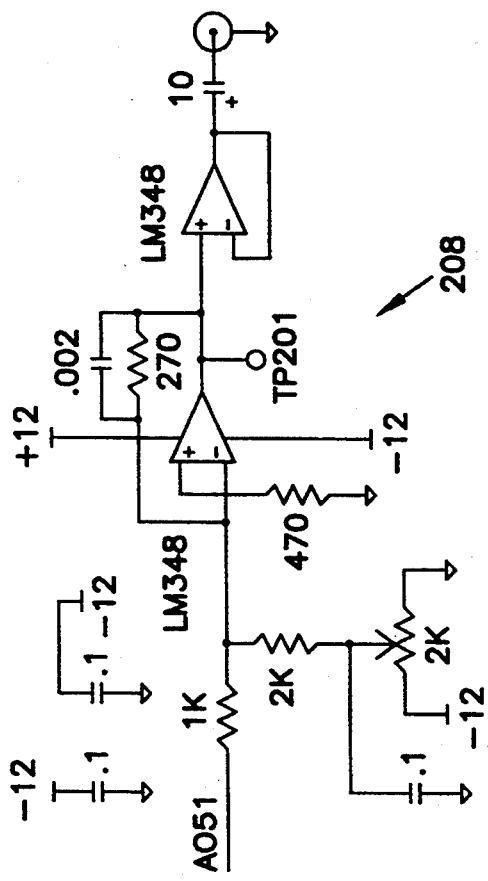
FIG. 21 is a circuit diagram of filters and buffers for third and fourth audio signals in the preferred receiver.

FIGS. 20 and 21 show the preferred circuit diagrams for the audio filters and buffers. Circuits 206–209 are each a two-stage circuit comprising a low pass filter coupled to an op-amp buffer for each of the four analog audio signals received from the demultiplexer.

Figure 22:
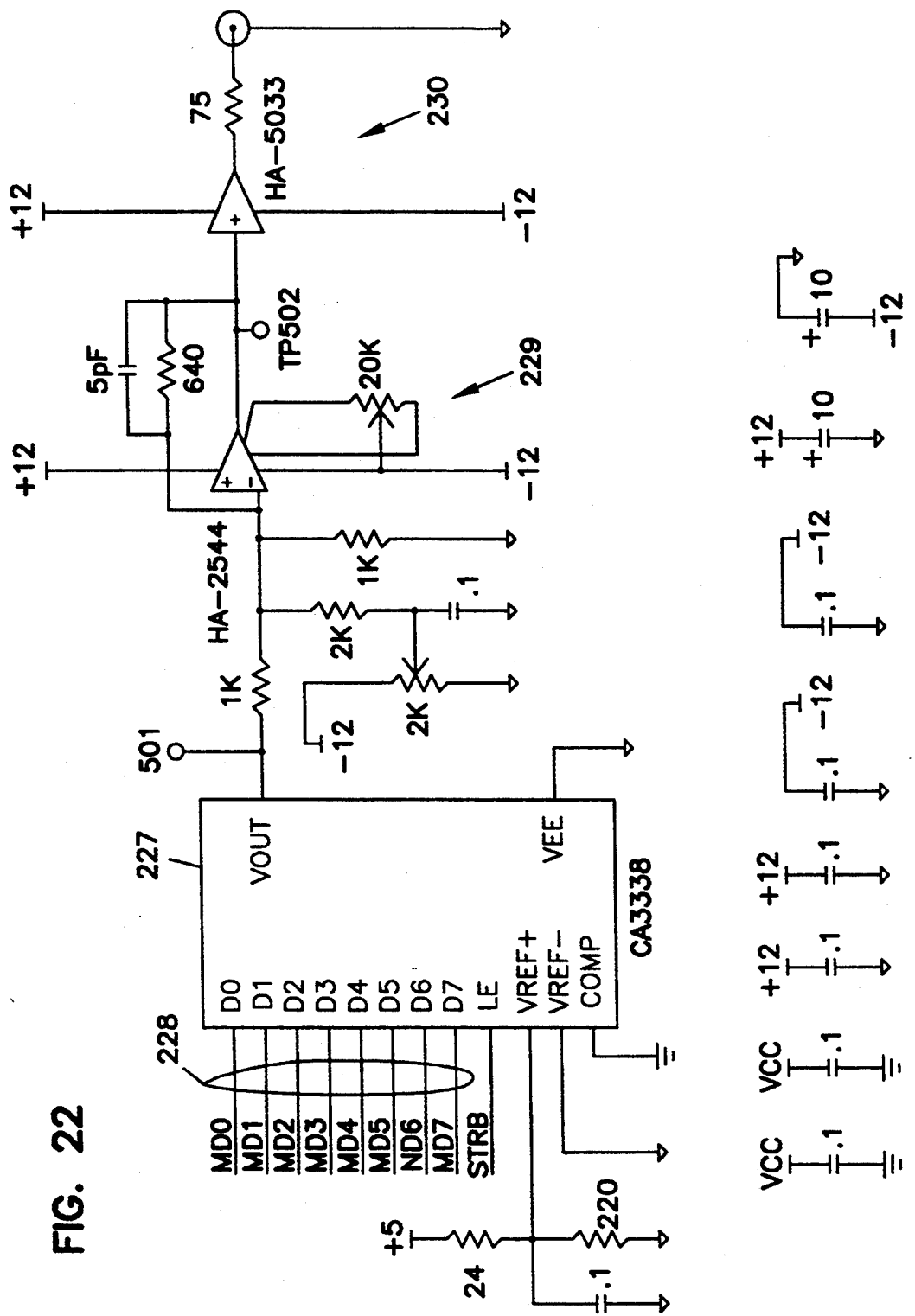
FIG. 22 is a preferred circuit diagram of a digital-to-analog converter and filter for a first digital video signal.
Figure 23:
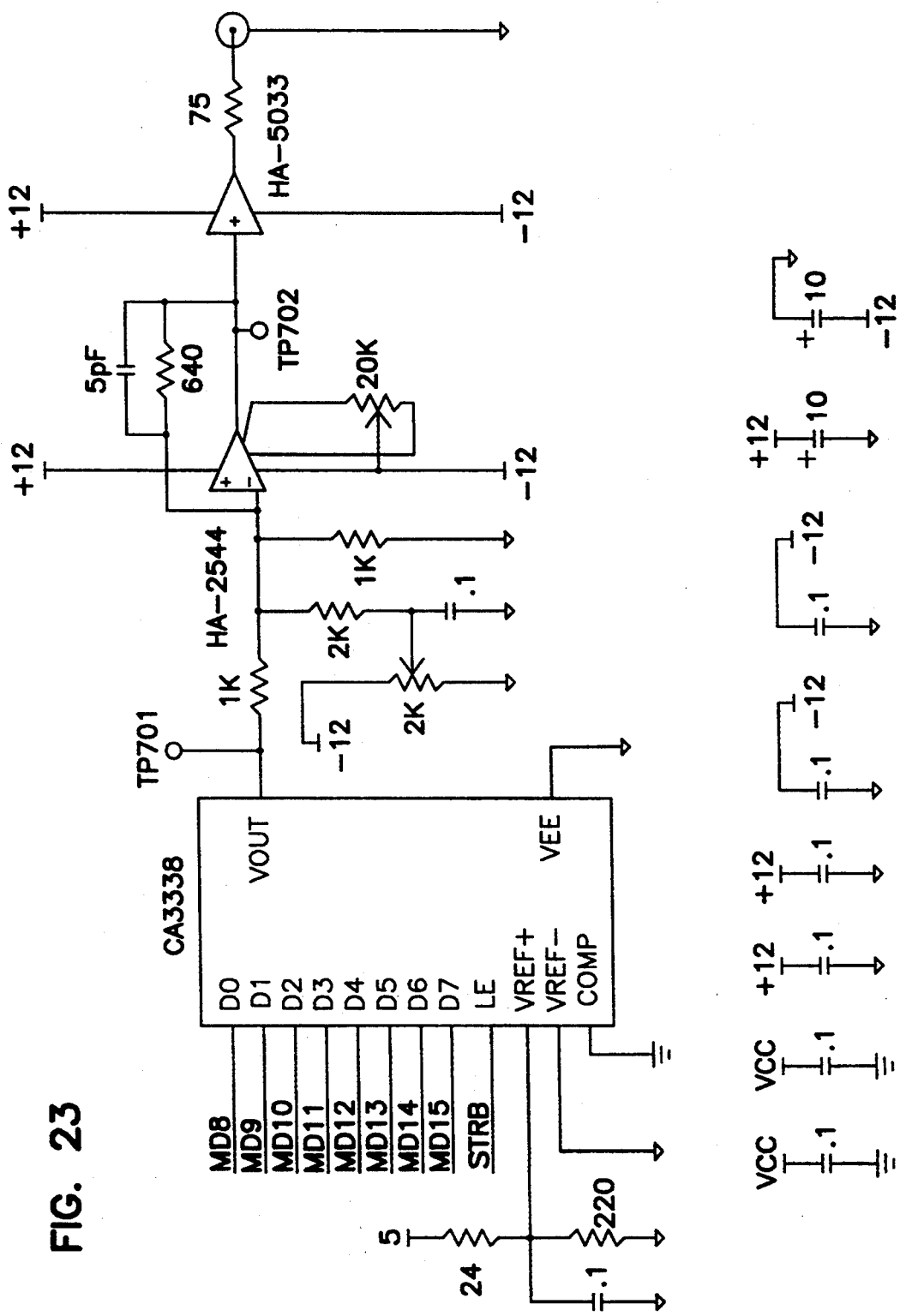
FIG. 23 is a preferred circuit diagram of a digital-to-analog converter and filter for a second digital video signal.
Figure 24:
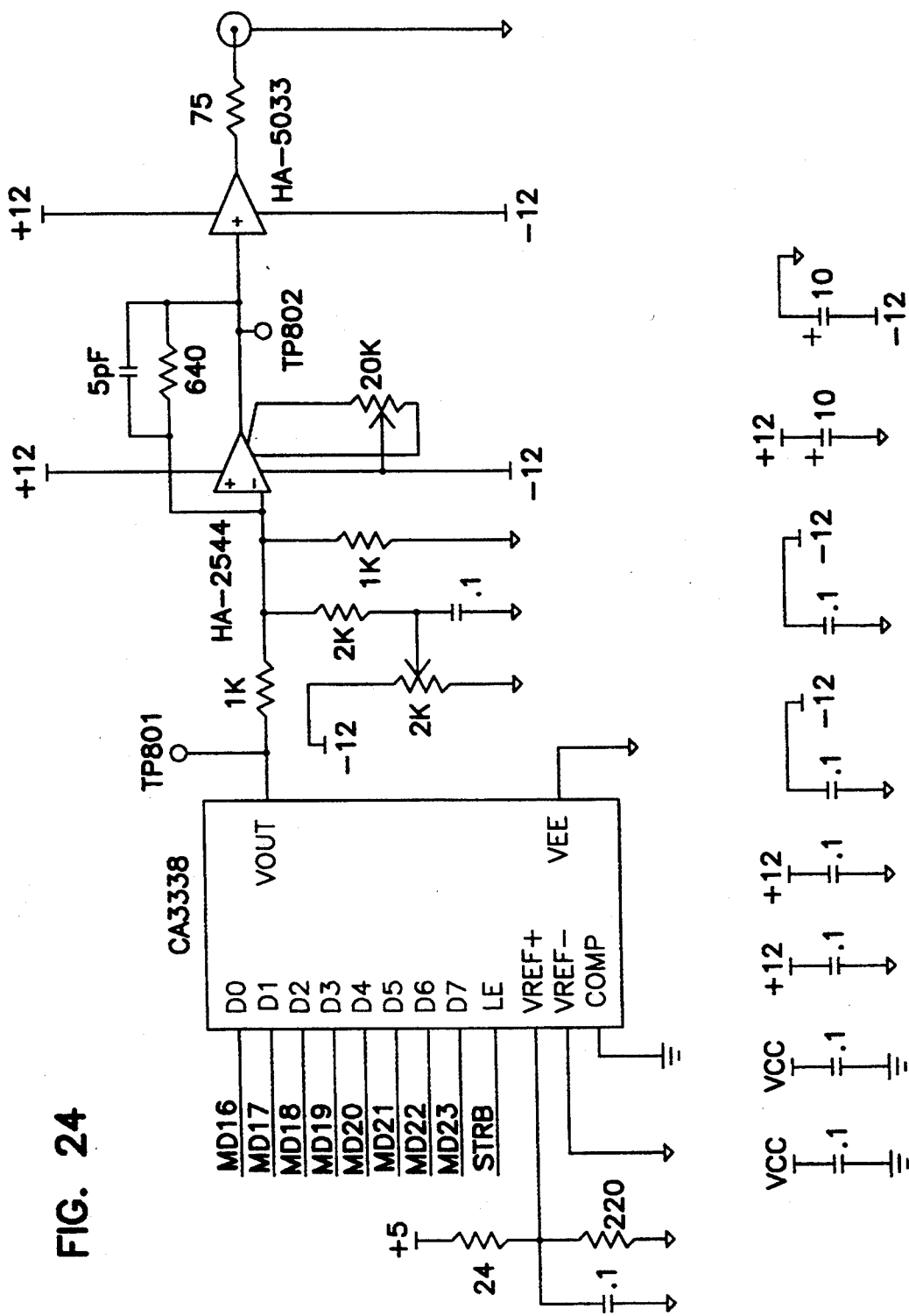
FIG. 24 is a preferred circuit diagram of a digital-to-analog converter and filter for a third digital video signal.
Figure 25:
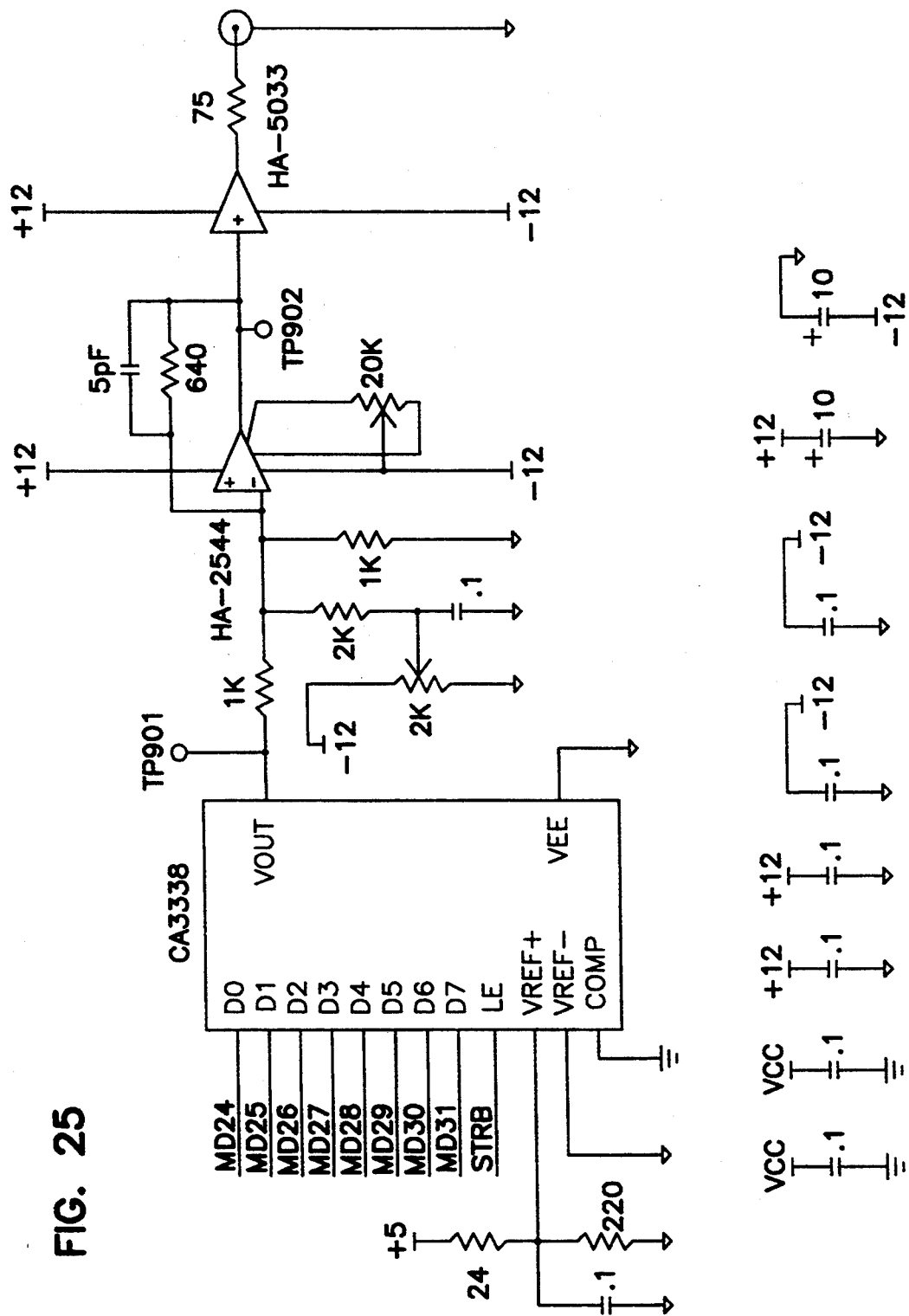
FIG. 25 is a preferred circuit diagram of a digital-to-analog converter and filter for a fourth digital video signal.

FIGS. 22–25 show the preferred circuit diagrams of the digital-to-analog converters, filters, and buffers for the four digital video signals. Referring to FIG. 22, a digital video signal is transmitted to a circuit 227 on lines 228 from the serial-to-parallel converter as shown in FIG. 18. Circuit 227 is a digital-to-analog converter which receives the digital data signal from lines 228 and converts it into a corresponding analog video signal. A low pass filter circuit 229 removes high frequency noise components from the analog video signal. Circuit 230 is an op-amp buffer. The circuitry of FIGS. 23–25 operates in a similar manner for the other three digital video signals.

Figure 26:
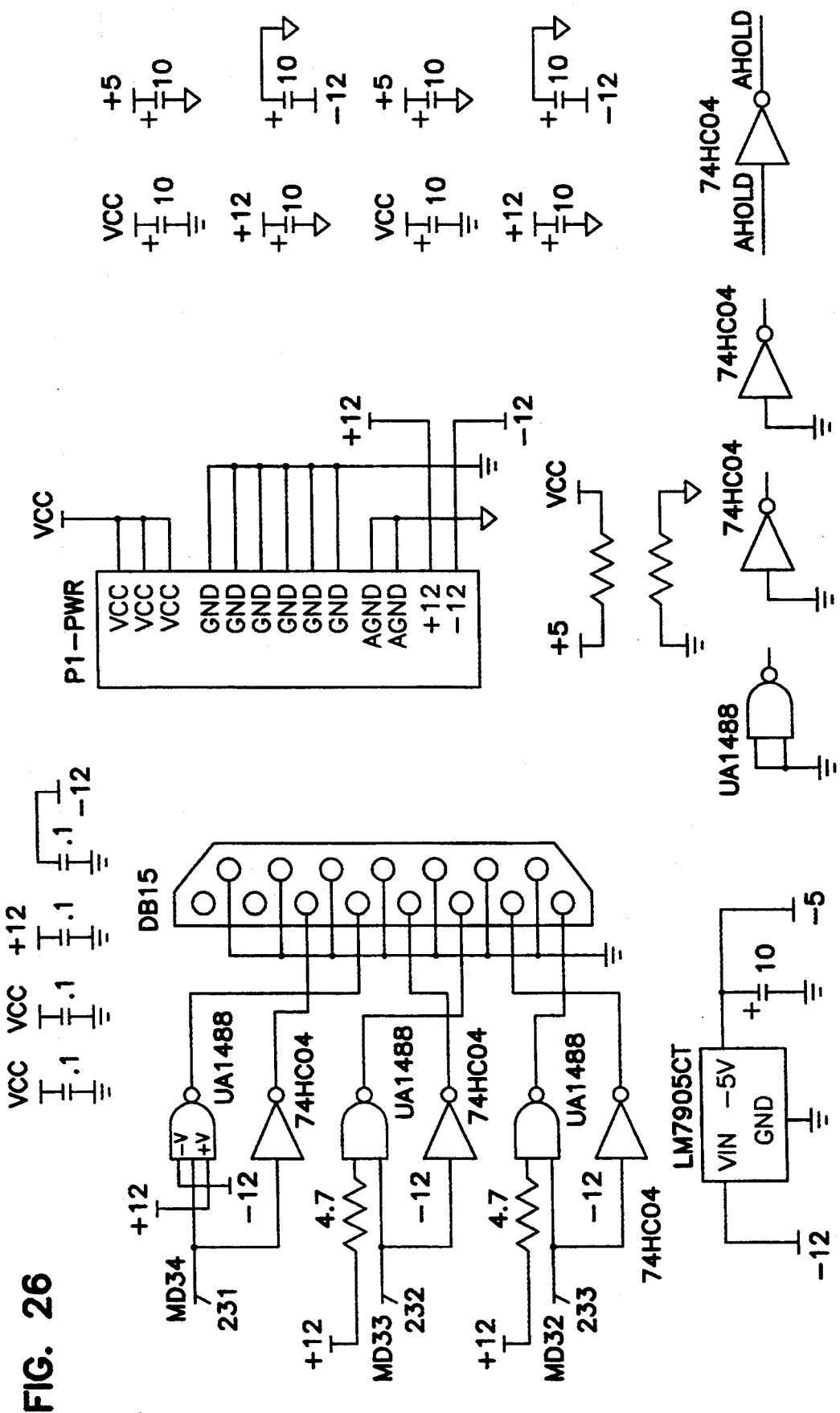
FIG. 26 is a preferred circuit diagram of the filters and buffers for three discrete signals.

FIG. 26 shows a preferred circuit diagram of buffers for the three discrete signals. This circuitry receives the three discrete signals on lines 231–233 from the serial-to-parallel converter as shown in FIG. 18 and buffers the three discrete signals before transmitting the signals to an output port. In the preferred embodiment, the discrete signals are either RS232 or TTL compatible signals.

ALTERNATE EMBODIMENT

In an alternate embodiment, the system may use the video channels for transmitting additional discrete signals instead of video signals. The large bandwidth of the video signals allows for many discrete signals to be transmitted across one video channel. In the alternate embodiment, the system can transmit a maximum of forty discrete signals across the four video channels, audio channel, and discrete channels.

The system accomplishes this by including a parallel combination of bandpass filters at the video inputs, one bandpass filter for each discrete signal, which may be selectively activated in place of low pass filters 107–110. The discrete signals are first frequency shifted so that each discrete signal occupies a specific narrow bandwidth within the total bandwidth for a video channel. Each bandpass filter is centered at a frequency corresponding to a carrier frequency of one of the frequency-shifted discrete signals so that each bandpass filter transmits only one discrete signal from the combination of discrete signals.

At the receiver end, the system also contains a parallel combination of bandpass filters, which may be selectively activated in place of low pass filters 146–149, to separate and distinguish the discrete signals. After filtering, the system may shift each of the discrete signals to an appropriate output frequency.

While the present invention has been described in connection with the preferred embodiment thereof, it will be understood that many modifications will be readily apparent to those skilled in the art, and this application is intended to cover any adaptations or variations thereof. For example, while the present invention has been illustrated as a communication system for use with a fiber optic cable, the system would also work with a coaxial cable.

It is manifestly intended that this invention be limited only by the claims and equivalents thereof.

What is claimed is:

1. A system for transmitting a plurality of analog video, analog audio, and discrete signals over a fiber optic channel, the system comprising:
   a) transmitter means for transmitting the analog video, the analog audio, and the discrete signals across the fiber optic channel, comprising:
      input means for receiving the analog video, the analog audio, and the discrete signals, the input means comprising:
         video input means for converting the analog video signal into a corresponding digital video signal; and
         audio input means for converting the analog audio signal into a corresponding digital audio signal;
      conversion means for converting the analog video, the analog audio, and the discrete signals into a corresponding digital serial signal, the conversion means comprising means for repeatedly receiving parallel bits comprising the digital audio, the digital video, and the discrete signals and for serially bit shifting the parallel bits in order to generate the digital serial signal; and
      lightwave conversion means for converting the digital serial signal into a corresponding lightwave signal and for transmitting the lightwave signal into the fiber optic channel; and
   b) receiver means for receiving the lightwave signal from the fiber optic channel and for restoring the analog video, the analog audio, and the discrete signals from the lightwave signal.

2. The system of claim 1 wherein the video input means comprises means for receiving a second plurality of discrete signals.

3. The system of claim 2 wherein the means for receiving a second plurality of discrete signals comprises a plurality of bandpass filters with each of the bandpass filters centered at a carrier frequency corresponding to one of the second plurality of discrete signals.

4. The system of claim 1 wherein the audio input means comprises:
   a) multiplexer for receiving a plurality of analog audio signal and for converting the plurality of analog audio signals into a single multiplexed analog audio signal; and
   b) analog-to-digital conversion means for receiving the multiplexed analog audio signal and for converting the multiplexed analog audio signal into a corresponding digital audio signal.

5. The system of claim 4 wherein the receiver means comprises:
   a) demultiplexer means for receiving the multiplexed digital audio signal and for converting the multiplexed digital audio signal into the corresponding plurality of digital audio signal; and
   a) audio output means for receiving the plurality of digital audio signals and for converting the plurality of digital audio signals into the corresponding plurality of analog audio signals.

6. The system of claim 1 wherein the video input means further comprises video filter means for removing noise from the analog video signal, the video filter means comprising means for removing noise comprising high frequency nose components which are greater in frequency than frequency components comprising the analog video signal.

7. The system of claim 1 wherein the audio input means further comprises audio filter means for removing noise from the analog audio signal, the audio filter means comprising means for removing noise comprising high frequency noise components which are greater in frequency than frequency components comprising the analog audio signal.

8. The system of claim 1 wherein the receiver means comprises:
   a) lightwave reception means for receiving the lightwave signal from the fiber optic channel and for converting the lightwave signal into a corresponding output serial digital signal;
   b) deconversion means for converting the output serial digital signal into an output composite signal comprising a digital video, a digital audio, and discrete signals; and
   c) decombining means for extracting from the output composite signal the analog video, the analog audio, and the discrete signals.

9. The system of claim 8 wherein the decombining means comprises:
   a) video output means for receiving the digital video signal and for converting the digital video signal into the analog video signal;
   b) audio output means for receiving the digital audio signal and for converting the digital audio signal into the analog audio signal; and
   c) discrete output means for receiving the discrete signals.

10. The system of claim 9 wherein the video output means further comprises video filter means for removing noise from the analog video signal, the video filter means comprising means for removing noise comprising high frequency noise components which are greater in frequency than frequency components comprising the analog video signal.

11. The system of claim 9 wherein the audio output means further comprises audio filter means for removing noise from the analog audio signal, the audio filter means comprising means for removing noise comprising high frequency noise components which are greater in frequency than frequency components comprising the analog audio signal.

12. The system of claim 9 wherein the video output means comprises means for outputting a second plurality of discrete signals.

13. The system of claim 12 wherein the means for outputting a second plurality of discrete signals comprises a plurality of bandpass filters with each of the bandpass filters centered at a carrier frequency corresponding to one of the plurality of discrete signals.

14. A system for full-duplex transmission of first and second analog video, analog audio, and discrete digital signals over a fiber optic channel, the system comprising:
   a) transmitter means for transmitting the analog video, the analog audio, and the discrete signals across the fiber optic channel, comprising:
      input means for receiving the analog video, the analog audio, and the discrete signals, the input means comprising:

video input means for converting the analog video signal into a corresponding digital video signal; and audio input means for converting the analog audio signal into a corresponding digital audio signal;

conversion means for converting the analog video, the analog audio, and the discrete signals into a corresponding digital serial signal, the conversion means comprising means for repeatedly receiving parallel bits comprising the digital audio, the digital video, and the discrete signals and for serially bit shifting the parallel bits in order to generate the digital serial signal; and lightwave conversion means for converting the digital serial signal into a corresponding lightwave signal and for transmitting the lightwave signal into the fiber optic channel;

b) receiver means for receiving a second serial lightwave signal from the fiber optic channel and for converting the second serial lightwave signal into the second analog video, analog audio, and discrete signals; and c) wavelength division multiplexer means, coupled to the transmitter means and receiver means, for simultaneously transmitting the first serial lightwave signal across the fiber optic channel at a first wavelength and for receiving the second lightwave signal transmitted from the fiber optic channel at a second wavelength.

* * * * *